US012690018B2

(12) United States Patent
Abdelghaffar et al.

(10) Patent No.: US 12,690,018 B2
(45) **Date of Patent: \*Jul. 21, 2026**

(54) CONFIGURATION AND INDICATION OF RESOURCES FOR PARTIAL FREQUENCY SOUNDING

(71) Applicant: QUALCOMM Incorporated, San Diego, CA (US)

(72) Inventors: Muhammad Sayed Khairy Abdelghaffar, San Jose, CA (US); Kexin Xiao, Shanghai (CN); Yu Zhang, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 303 days.

This patent is subject to a terminal disclaimer.

(21) Appl. No.: 18/264,554

(22) PCT Filed: Apr. 4, 2021

(86) PCT No.: PCT/CN2021/085501
§ 371 (c)(1),
(2) Date: Aug. 7, 2023

(87) PCT Pub. No.: WO2022/213227
PCT Pub. Date: Oct. 13, 2022

(65) Prior Publication Data
US 2024/0048308 A1 Feb. 8, 2024

(51) Int. Cl.
*H04W 72/044* (2023.01)
*H04L 5/00* (2006.01)
*H04W 72/23* (2023.01)

(52) U.S. Cl.
CPC ........... *H04W 72/044* (2013.01); *H04L 5/001* (2013.01); *H04L 5/0048* (2013.01);
(Continued)

(58) Field of Classification Search
CPC ............. H04W 72/044; H04W 72/046; H04W 72/053; H04W 72/23; H04L 5/001;
(Continued)

(56) References Cited

U.S. PATENT DOCUMENTS

2013/0215859 A1    8/2013  Moriai
2019/0173644 A1    6/2019  Lyu et al.
(Continued)

FOREIGN PATENT DOCUMENTS

CN        110383927 A        10/2019
CN        111277389 A         6/2020
(Continued)

OTHER PUBLICATIONS

3GPP TS 38.211 V16.5.0, 3rd Generation Partnership Project; Technical Specification Group Radio Access Network; NR; Physical channels and modulation (Release 16) (Year: 2021).*
(Continued)

*Primary Examiner* — Andrew W Chriss
(74) *Attorney, Agent, or Firm* — Holland & Hart LLP

(57) ABSTRACT

Methods, systems, and devices for wireless communications are described. A user equipment (UE) may receive an indication of a configuration that may identify a set of time and frequency resources for transmission of sounding reference signals, the set of time and frequency resources including a plurality of subsets of time and frequency resources. Each subset of time and frequency resources of the plurality of subsets of time and frequency resources may be associated with a corresponding value of a plurality of values of a partial frequency parameter. The UE may receive control signaling indicating a value of the partial frequency parameter of the plurality of values. The UE may transmit a sounding reference signal on a subset of time and frequency resources of the plurality of subsets of time and frequency
(Continued)

Configuration Indication 220
Control Signaling 225
Sounding Reference Signal 230

200 resources that corresponds to the value of the partial frequency parameter indicated by the received control signaling.

30 Claims, 20 Drawing Sheets

(52) U.S. Cl.
CPC .......... *H04L 5/0051* (2013.01); *H04L 5/0053* (2013.01); *H04W 72/23* (2023.01)

(58) Field of Classification Search
CPC ... H04L 5/0048; H04L 5/0051; H04L 5/0053; H04L 5/0094
See application file for complete search history.

(56) References Cited

U.S. PATENT DOCUMENTS

| | | | |
|---|---|---|---|
| 2020/0120683 A1* | 4/2020 | Kakishima | .......... H04L 25/0226 |
| 2020/0351129 A1 | 11/2020 | Kwak et al. | |
| 2022/0236366 A1* | 7/2022 | Cha | ................... H04W 72/0453 |
| 2022/0321312 A1 | 10/2022 | Chou et al. | |
| 2022/0330218 A1 | 10/2022 | Abdelghaffar et al. | |
| 2023/0117977 A1* | 4/2023 | Sun | ....................... H04L 5/0048 |
| | | | 370/329 |
| 2023/0223985 A1* | 7/2023 | Rastegardoost | ..... H04B 1/7143 |
| | | | 375/132 |
| 2023/0239088 A1* | 7/2023 | Gao | ...................... H04L 5/0051 |
| | | | 370/329 |
| 2023/0388076 A1* | 11/2023 | Yokomakura | ......... H04L 5/0048 |

FOREIGN PATENT DOCUMENTS

| | | |
|---|---|---|
| CN | 111480309 A | 7/2020 |
| KR | 20180081450 A | 7/2018 |
| WO | WO-2018128401 A1 | 7/2018 |
| WO | WO-2018151554 A1 | 8/2018 |
| WO | WO-2018199696 A1 | 11/2018 |
| WO | WO-2019096244 A1 | 5/2019 |
| WO | WO-2020144896 A1 | 7/2020 |
| WO | WO-2021260099 A1 | 12/2021 |
| WO | WO-2022061640 A1 | 3/2022 |
| WO | WO-2022126148 A2 | 6/2022 |
| WO | WO-2022205486 A1 | 10/2022 |

OTHER PUBLICATIONS

3GPP TSG RAN WG1 #103-e R1-2007547 (Futurewei), Sounding enhancement for interference probing in TDD massive MIMO (Year: 2020).*

3GPP TSG RAN WG1 Meeting #103-e R1-2009384 (Moderator (ZTE), FL summary #1 on SRS enhancements (Year: 2020).*

Moderator (ZTE): "FL Summary #1 on SRS Enhancements", 3GPP TSG RAN WG1 Meeting #104-e, R1-2101783, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 27, 2021, 49 Pages, XP051975885, Sect. 2.2: Futurewei and Futurewei2 contributions, p. 18, Sect. 6.1: Agreement Candidates Schemes for Class 2 and Class 3, p. 44.

Supplementary European Search Report—EP21935467—Search Authority—The Hague—Nov. 29, 2024.

Huawei, et al., "Discussion on SRS Enhancements for Rel-17", R1-2007591, 3GPP TSG RAN WG1 Meeting #103-e, E-meeting, Oct. 26-Nov. 13, 2020, the whole document, 16 Pages.

International Search Report and Written Opinion—PCT/CN2021/085501—ISA/EPO—Jan. 4, 2022.

Lenovo, et al., "Enhancements on SRS", R1-2100277, 3GPP TSG RAN WG1 #104-e, e-Meeting, Jan. 25-Feb. 5, 2021, the whole document, 10 Pages.

Moderator (ZTE): "FL Summary #1 on SRS Enhancements", R1-2101783, 3GPP TSG RAN WG1 Meeting #104-e, Jan. 27, 2021, p. 34, e-Meeting, Jan. 25-Feb. 5, 2021, section 2.1.3, chapters 4-5, 49 Pages.

Moderator (ZTE): "FL Summary #3 on SRS Enhancements", 3GPP TSG RAN WG1 Meeting #104-e, R1-2101917, e-Meeting, Jan. 25, 2021-Feb. 5, 2021, Feb. 3, 2021, 25 Pages.

* cited by examiner

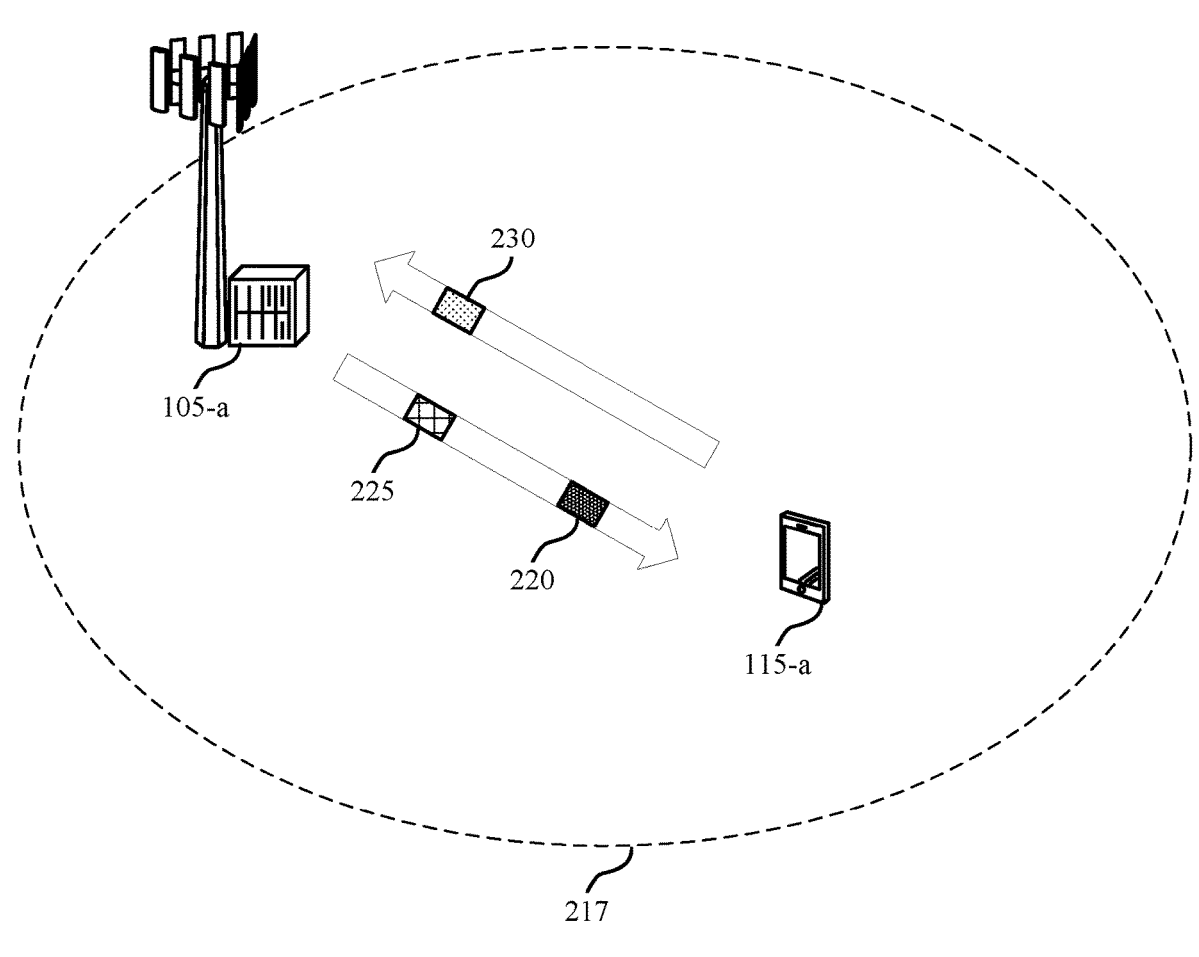
 Configuration Indication 220
Control Signaling 225
Sounding Reference Signal 230
FIG. 2

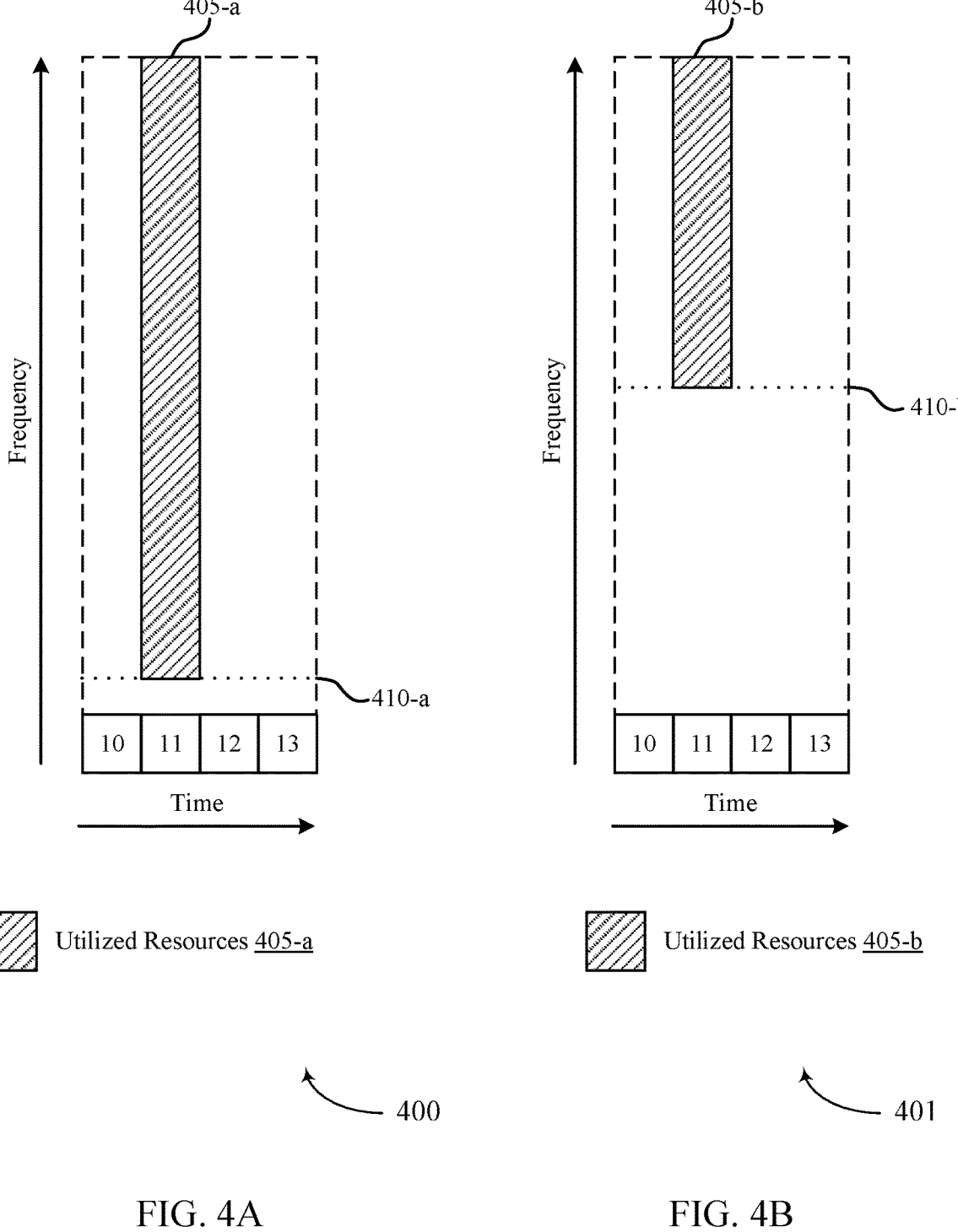
FIG. 4A                    FIG. 4B

| PF Value 505 | Number of Symbols 510 | Frequency Offset Pattern 515 |
|---|---|---|
| 2 | 2 | 0,1 |
| 2 | 4 | 0,0,1,1 |
| 4 | 2 | 0,3 |
| 4 | 4 | 0,1,3,2 |

500

| PF Value 505 | Number of Symbols 510 | Frequency Offset Pattern 515 |
|---|---|---|
| 2 | 2 | {0,1}, {1,0} |
| 2 | 4 | {0,0,1,1}, {1,1,0,0} |
| 4 | 2 | {0,3}, {0,2} |
| 4 | 4 | {0,1,3,2}, {0,3,2,1} |

501

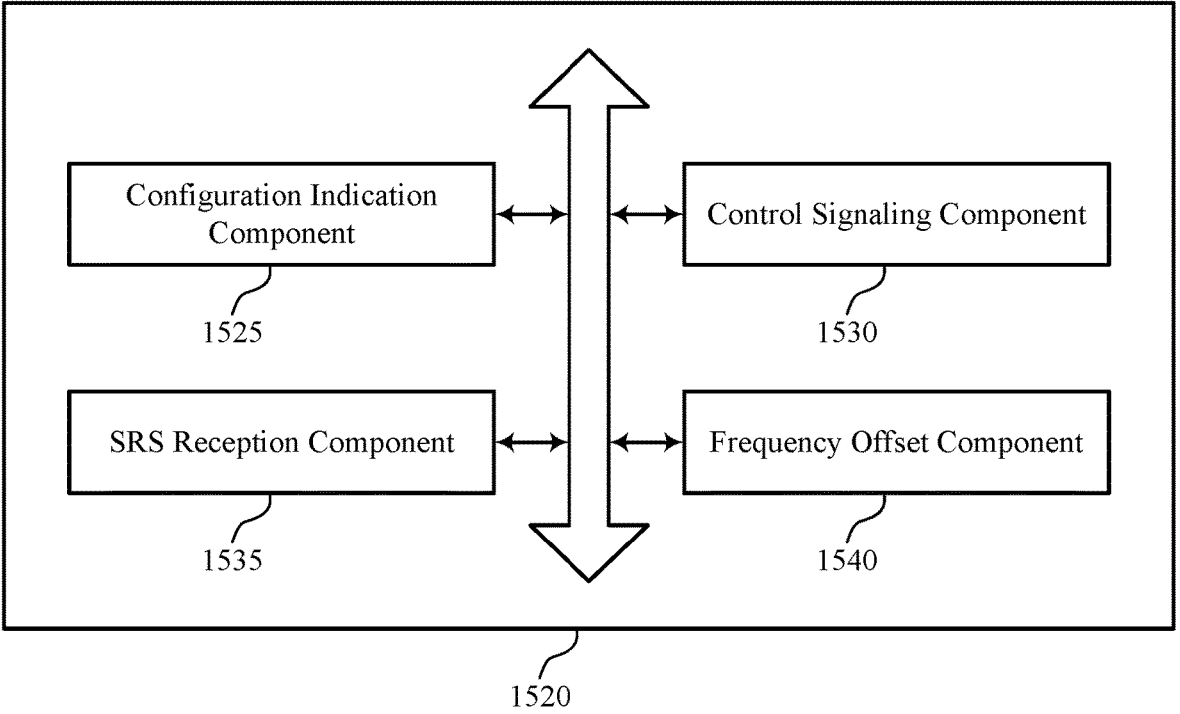
FIG. 15

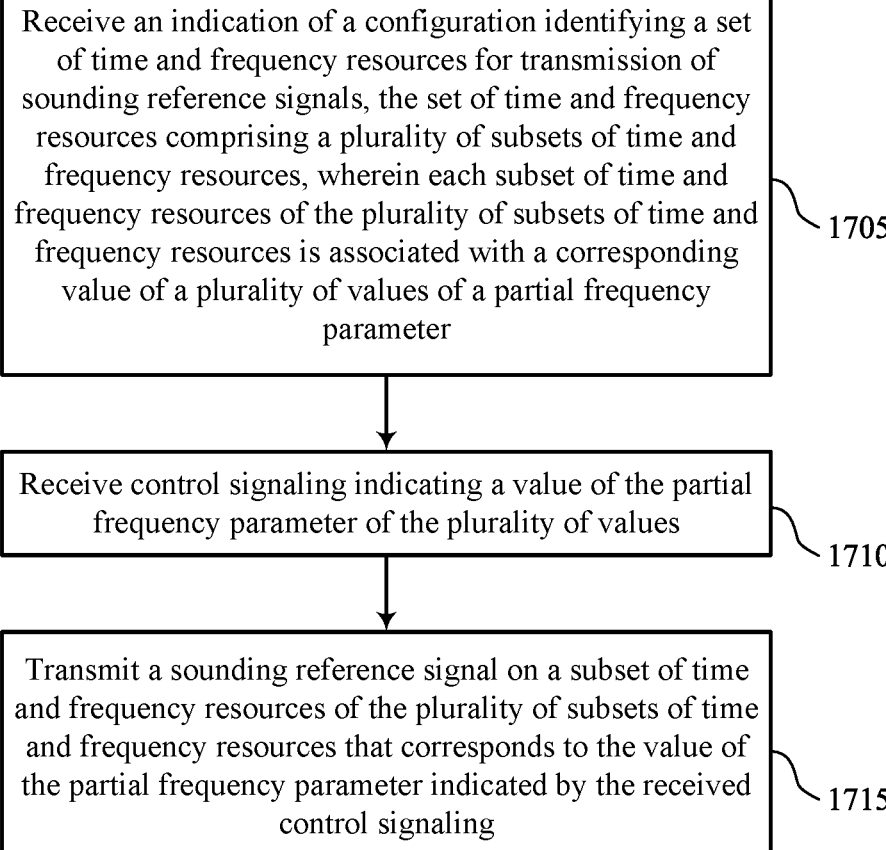

Receive an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter

1705

Receive control signaling indicating a value of the partial frequency parameter of the plurality of values

1710

Transmit a sounding reference signal on a subset of time and frequency resources of the plurality of subsets of time and frequency resources that corresponds to the value of the partial frequency parameter indicated by the received control signaling

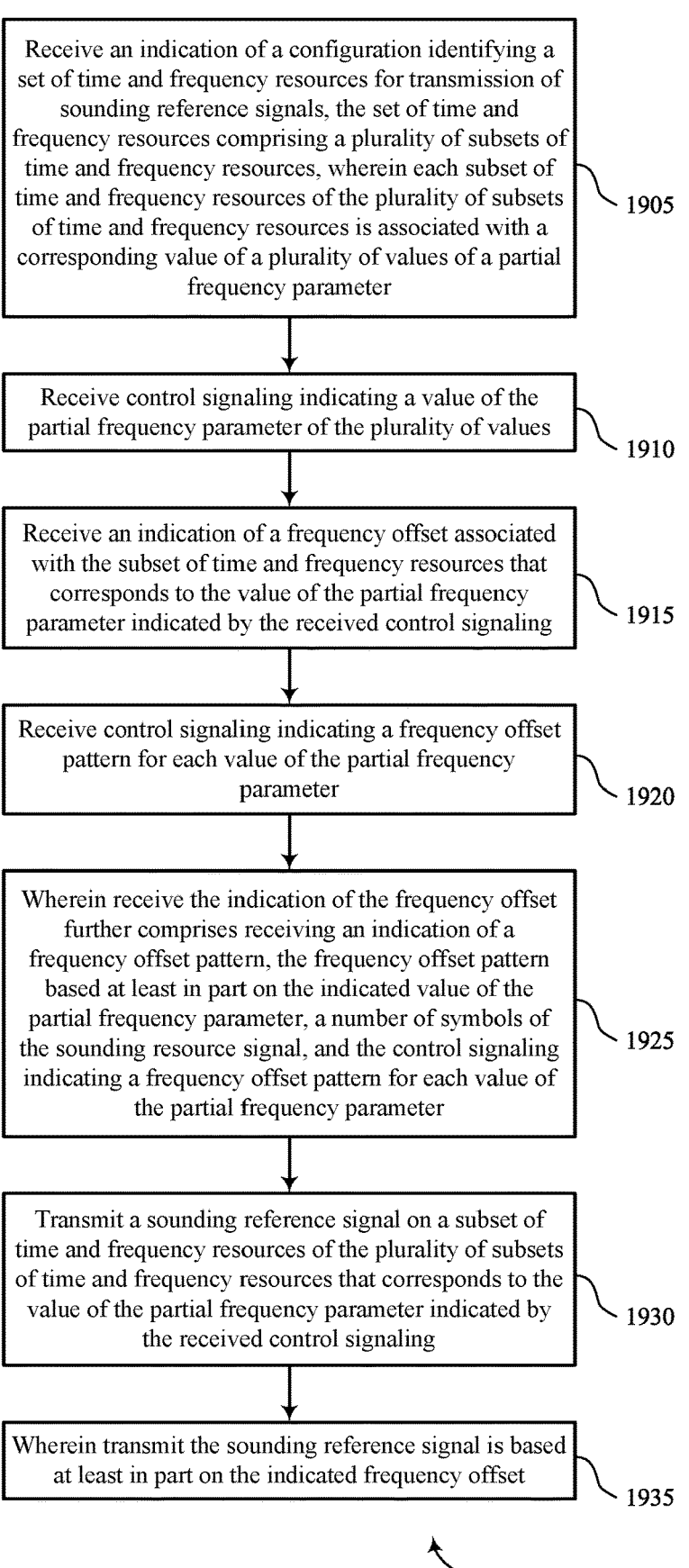

Receive an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter

1905

Receive control signaling indicating a value of the partial frequency parameter of the plurality of values

1910

Receive an indication of a frequency offset associated with the subset of time and frequency resources that corresponds to the value of the partial frequency parameter indicated by the received control signaling

1915

Receive control signaling indicating a frequency offset pattern for each value of the partial frequency parameter

1920

Wherein receive the indication of the frequency offset further comprises receiving an indication of a frequency offset pattern, the frequency offset pattern based at least in part on the indicated value of the partial frequency parameter, a number of symbols of the sounding resource signal, and the control signaling indicating a frequency offset pattern for each value of the partial frequency parameter

1925

Transmit a sounding reference signal on a subset of time and frequency resources of the plurality of subsets of time and frequency resources that corresponds to the value of the partial frequency parameter indicated by the received control signaling

1930

Wherein transmit the sounding reference signal is based at least in part on the indicated frequency offset

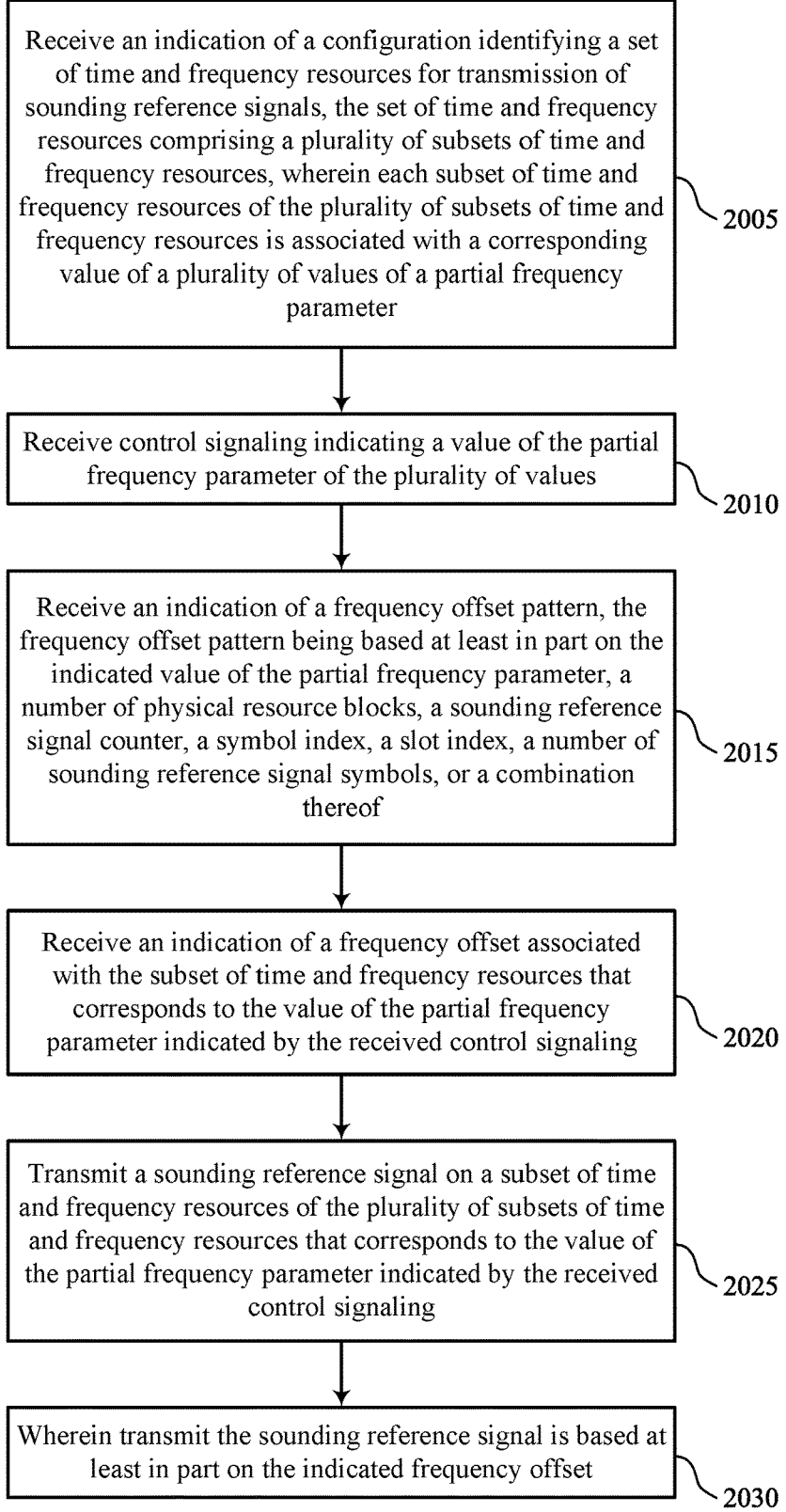

Receive an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter

2005

Receive control signaling indicating a value of the partial frequency parameter of the plurality of values

2010

Receive an indication of a frequency offset pattern, the frequency offset pattern being based at least in part on the indicated value of the partial frequency parameter, a number of physical resource blocks, a sounding reference signal counter, a symbol index, a slot index, a number of sounding reference signal symbols, or a combination thereof

2015

Receive an indication of a frequency offset associated with the subset of time and frequency resources that corresponds to the value of the partial frequency parameter indicated by the received control signaling

2020

Transmit a sounding reference signal on a subset of time and frequency resources of the plurality of subsets of time and frequency resources that corresponds to the value of the partial frequency parameter indicated by the received control signaling

2025

Wherein transmit the sounding reference signal is based at least in part on the indicated frequency offset

CONFIGURATION AND INDICATION OF RESOURCES FOR PARTIAL FREQUENCY SOUNDING

CROSS REFERENCE

The present application is a 371 national stage filing of International PCT Application No. PCT/CN2021/085501 by ABDELGHAFFAR et al. entitled "CONFIGURATION AND INDICATION OF RESOURCES FOR PARTIAL FREQUENCY SOUNDING," filed Apr. 4, 2021, which is assigned to the assignee hereof, and which is expressly incorporated by reference in its entirety herein.

FIELD OF TECHNOLOGY

The following relates to wireless communications, including configuration and indication of resources for partial frequency sounding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may transmit a sounding reference signal (SRS) to a base station for channel quality estimation. The base station may indicate to the UE what time and frequency resources to use for the SRS transmission. Conventional methods for configuration and indication of time and frequency resources for SRS transmission may be deficient.

SUMMARY

The described techniques relate to improved methods, systems, devices, and apparatuses that support configuration and indication of resources for partial frequency sounding. Generally, the described techniques provide for configuration and indication of resources for partial frequency sounding. A user equipment (UE) may receive an indication of a configuration identifying a set of time and frequency resources for transmission of sounding reference signals. The set of time and frequency resources may include a plurality of subsets of time and frequency resources, and each subset of time and frequency resources of the plurality of subsets of time and frequency resources may be associated with a corresponding value of a plurality of values of a partial frequency parameter. The UE may receive control signaling that may indicate a value of the partial frequency parameter of the plurality of values. The UE may transmit a sounding reference signal on a subset of time and frequency resources of the plurality of subsets of time and frequency resources that may correspond to the value of the partial frequency parameter indicated by the received control signaling.

A method for wireless communications at a user equipment (UE) is described. The method may include receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, receiving control signaling indicating a value of the partial frequency parameter of the set of multiple values, and transmitting a sounding reference signal on a subset of time and frequency resources of the set of multiple subsets of time and frequency resources that corresponds to the value of the partial frequency parameter indicated by the received control signaling.

An apparatus for wireless communications at a UE is described. The apparatus may include a processor, memory coupled with the processor, and instructions stored in the memory. The instructions may be executable by the processor to cause the apparatus to receive an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, receive control signaling indicating a value of the partial frequency parameter of the set of multiple values, and transmit a sounding reference signal on a subset of time and frequency resources of the set of multiple subsets of time and frequency resources that corresponds to the value of the partial frequency parameter indicated by the received control signaling.

Another apparatus for wireless communications at a UE is described. The apparatus may include means for receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, means for receiving control signaling indicating a value of the partial frequency parameter of the set of multiple values, and means for transmitting a sounding reference signal on a subset of time and frequency resources of the set of multiple subsets of time and frequency resources that corresponds to the value of the partial frequency parameter indicated by the received control signaling.

A non-transitory computer-readable medium storing code for wireless communications at a UE is described. The code may include instructions executable by a processor to receive an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, receive control signaling indicating a value of the partial frequency parameter of the set of multiple values, and transmit a sounding reference signal on a subset of time and frequency resources of the set of multiple subsets of time and frequency resources that corresponds to the value of the partial frequency parameter indicated by the received control signaling.

Some examples of the method, apparatuses, and non-transitory computer-readable medium described herein may further include operations, features, means, or instructions for receiving control signaling indicating the value of the partial frequency parameter includes receiving a value of the partial frequency parameter of the set of multiple values of the partial frequency parameter for each time resource of the subset of time and frequency resources on which the sounding reference signal may be transmitted and transmitting the sounding reference signal may be based on the received value of the partial frequency parameter for each time resource.

In some examples of the method, apparatuses, and non-transitory computer-readable medium described herein, transmitting the sounding reference signal may include operations, features, means, or instructions for receiving an indication of a length of the sounding reference signal, the length of the sounding reference signal based on the value of the partial frequency parameter indicated by the received control signaling.

Some examples of the method, apparatuses, and non-transitory computer-readable medium described herein may further include operations, features, means, or instructions for receiving an indication of a frequency offset associated with the subset of time and frequency resources that corresponds to the value of the partial frequency parameter indicated by the received control signaling; and where transmitting the sounding reference signal may be based on the indicated frequency offset.

In some examples of the method, apparatuses, and non-transitory computer-readable medium described herein, receiving an indication of the frequency offset may include operations, features, means, or instructions for receiving an indication of a frequency offset for each symbol of the transmitted sounding reference signal.

In some examples of the method, apparatuses, and non-transitory computer-readable medium described herein, receiving an indication of the frequency offset may include operations, features, means, or instructions for receiving an indication of a frequency offset for each time resource slot at least partially occupied by the transmitted sounding reference signal.

Some examples of the method, apparatuses, and non-transitory computer-readable medium described herein may further include operations, features, means, or instructions for receiving control signaling indicating a frequency offset pattern for each value of the partial frequency parameter and where receiving the indication of the frequency offset further includes receiving an indication of a frequency offset pattern, the frequency offset pattern based on the indicated value of the partial frequency parameter, a number of symbols of the sounding resource signal, and the control signaling indicating a frequency offset pattern for each value of the partial frequency parameter.

Some examples of the method, apparatuses, and non-transitory computer-readable medium described herein may further include operations, features, means, or instructions for receiving control signaling indicating a set of multiple frequency offset patterns for each value of the partial frequency parameter and where receiving the indication of the frequency offset further includes receiving an indication of a frequency offset pattern, the frequency offset pattern based on the indicated value of the partial frequency parameter and receiving control signaling indicating a frequency offset pattern of the set of multiple frequency offset patterns corresponding to the indicated value of the partial frequency parameter.

In some examples of the method, apparatuses, and non-transitory computer-readable medium described herein, receiving the indication of the frequency offset may include operations, features, means, or instructions for receiving an indication of a single frequency offset for the subset of time and frequency resources on which the sounding reference signal may be transmitted.

In some examples of the method, apparatuses, and non-transitory computer-readable medium described herein, receiving the indication of the single frequency offset may include operations, features, means, or instructions for receiving an indication of a frequency resource configuration value indicating a frequency domain shift in the subset of time and frequency resources on which the sounding reference signal may be transmitted.

In some examples of the method, apparatuses, and non-transitory computer-readable medium described herein, receiving the indication of the frequency offset may include operations, features, means, or instructions for receiving an indication of a frequency offset for each time resource of the subset of time and frequency resources on which the sounding reference signal may be transmitted.

In some examples of the method, apparatuses, and non-transitory computer-readable medium described herein, receiving the indication of the frequency offset for each time resource may include operations, features, means, or instructions for receiving an indication of a frequency resource configuration value for each time resource indicating a frequency domain shift in the subset of time and frequency resources on which the sounding reference signal may be transmitted.

Some examples of the method, apparatuses, and non-transitory computer-readable medium described herein may further include operations, features, means, or instructions for receiving an indication of a frequency offset pattern, the frequency offset pattern being based on the indicated value of the partial frequency parameter, a number of physical resource blocks, a sounding reference signal counter, a symbol index, a slot index, a number of sounding reference signal symbols, or a combination thereof.

Some examples of the method, apparatuses, and non-transitory computer-readable medium described herein may further include operations, features, means, or instructions for receiving control signaling indicating a frequency resource configuration value indicating a frequency domain shift in the subset of time and frequency resources on which the sounding reference signal may be transmitted or a frequency domain position reference point in the subset of time and frequency resources on which the sounding reference signal may be transmitted.

A method for wireless communications at a base station is described. The method may include transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, transmitting control signaling indicating a value of the partial frequency parameter of the set of multiple values, and receiving a sounding reference signal on a subset of time and frequency resources of the set of multiple subsets of time and frequency resources that corresponds to the value of the partial frequency parameter indicated by the received control signaling.

An apparatus for wireless communications at a base station is described. The apparatus may include a processor, memory coupled with the processor, and instructions stored in the memory. The instructions may be executable by the processor to cause the apparatus to transmit, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, transmit control signaling indicating a value of the partial frequency parameter of the set of multiple values, and receive a sounding reference signal on a subset of time and frequency resources of the set of multiple subsets of time and frequency resources that corresponds to the value of the partial frequency parameter indicated by the received control signaling.

Another apparatus for wireless communications at a base station is described. The apparatus may include means for transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, means for transmitting control signaling indicating a value of the partial frequency parameter of the set of multiple values, and means for receiving a sounding reference signal on a subset of time and frequency resources of the set of multiple subsets of time and frequency resources that corresponds to the value of the partial frequency parameter indicated by the received control signaling.

A non-transitory computer-readable medium storing code for wireless communications at a base station is described. The code may include instructions executable by a processor to transmit, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter, transmit control signaling indicating a value of the partial frequency parameter of the set of multiple values, and receive a sounding reference signal on a subset of time and frequency resources of the set of multiple subsets of time and frequency resources that corresponds to the value of the partial frequency parameter indicated by the received control signaling.

Some examples of the method, apparatuses, and non-transitory computer-readable medium described herein may further include operations, features, means, or instructions for transmitting control signaling indicating the value of the partial frequency parameter includes transmitting a value of the partial frequency parameter of the set of multiple values of the partial frequency parameter for each time resource of the subset of time and frequency resources on which the sounding reference signal may be transmitted and receiving the sounding reference signal may be based on the transmitted value of the partial frequency parameter for each time resource.

In some examples of the method, apparatuses, and non-transitory computer-readable medium described herein, receiving the sounding reference signal may include operations, features, means, or instructions for transmitting an indication of a length of the sounding reference signal, the length of the sounding reference signal based on the value of the partial frequency parameter indicated by the received control signaling.

Some examples of the method, apparatuses, and non-transitory computer-readable medium described herein may further include operations, features, means, or instructions for transmitting an indication of a frequency offset associated with the subset of time and frequency resources that corresponds to the value of the partial frequency parameter indicated by the transmitted control signaling and where receiving the sounding reference signal may be based on the indicated frequency offset.

In some examples of the method, apparatuses, and non-transitory computer-readable medium described herein, transmitting an indication of the frequency offset may include operations, features, means, or instructions for transmitting an indication of a frequency offset for each symbol of the received sounding reference signal.

In some examples of the method, apparatuses, and non-transitory computer-readable medium described herein, transmitting an indication of the frequency offset may include operations, features, means, or instructions for transmitting an indication of a frequency offset for each time resource slot at least partially occupied by the received sounding reference signal.

Some examples of the method, apparatuses, and non-transitory computer-readable medium described herein may further include operations, features, means, or instructions for transmitting control signaling indicating a frequency offset pattern for each value of the partial frequency parameter and where transmitting the indication of the frequency offset further includes transmitting an indication of a frequency offset pattern, the frequency offset pattern based on the indicated value of the partial frequency parameter, a number of symbols of the sounding resource signal, and the control signaling indicating a frequency offset pattern for each value of the partial frequency parameter.

Some examples of the method, apparatuses, and non-transitory computer-readable medium described herein may further include operations, features, means, or instructions for transmitting control signaling indicating a set of multiple frequency offset patterns for each value of the partial frequency parameter and where transmitting the indication of the frequency offset further includes transmitting an indication of a frequency offset pattern, the frequency offset pattern based on the indicated value of the partial frequency parameter and transmitting control signaling indicating a frequency offset pattern of the set of multiple frequency offset patterns corresponding to the indicated value of the partial frequency parameter.

In some examples of the method, apparatuses, and non-transitory computer-readable medium described herein, transmitting the indication of the frequency offset may include operations, features, means, or instructions for transmitting an indication of a single frequency offset for the subset of time and frequency resources on which the sounding reference signal may be received.

In some examples of the method, apparatuses, and non-transitory computer-readable medium described herein, transmitting the indication of the single frequency offset may include operations, features, means, or instructions for transmitting an indication of a frequency resource configuration value indicating a frequency domain shift in the subset of time and frequency resources on which the sounding reference signal may be transmitted.

In some examples of the method, apparatuses, and non-transitory computer-readable medium described herein, transmitting the indication of the frequency offset may include operations, features, means, or instructions for transmitting an indication of a frequency offset for each time resource of the subset of time and frequency resources on which the sounding reference signal may be transmitted.

In some examples of the method, apparatuses, and non-transitory computer-readable medium described herein, transmitting the indication of the frequency offset for each time resource may include operations, features, means, or instructions for transmitting an indication of a frequency resource configuration value for each time resource indicating a frequency domain shift in the subset of time and frequency resources on which the sounding reference signal may be transmitted.

Some examples of the method, apparatuses, and non-transitory computer-readable medium described herein may further include operations, features, means, or instructions for transmitting an indication of a frequency offset pattern, the frequency offset pattern being based on the indicated value of the partial frequency parameter, a number of physical resource blocks, a sounding reference signal counter, a symbol index, a slot index, a number of sounding reference signal symbols, or a combination thereof.

Some examples of the method, apparatuses, and non-transitory computer-readable medium described herein may further include operations, features, means, or instructions for transmitting control signaling indicating, in the subset of time and frequency resources on which the sounding reference signal may be received, a frequency resource configuration value indicating a frequency domain or a frequency domain position reference point.

BRIEF DESCRIPTION OF THE DRAWINGS

FIG. 2 illustrates an example of a wireless system that supports configuration and indication of resources for PFS in accordance with aspects of the present disclosure.

FIGS. 4A and 4B illustrate examples of time and frequency resource configurations that support configuration and indication of resources for PFS in accordance with aspects of the present disclosure.

FIG. 15 shows a block diagram of a communications manager that supports configuration and indication of resources for PFS in accordance with aspects of the present disclosure.

FIGS. 17 through 20 show flowcharts illustrating methods that support configuration and indication of resources for PFS in accordance with aspects of the present disclosure.

DETAILED DESCRIPTION

In wireless communications, a user equipment (UE) may transmit a sounding reference signal (SRS) to the base station to evaluate a quality of an uplink channel. In some cases, the UE may send the SRS over designated time and frequency resources. Such approaches may utilize various parameters to determine the resources used for SRS. However, conventional techniques are limited in their coverage and capacity. For example, physical resource block allocations are determined by the use of a table based on various parameters related to resource allocation, frequency hopping, and the like. However, such an approach does not allow for all possibilities of allocation and hopping, and is inflexible.

To improve flexibility and increase coverage and capacity for sounding over partial frequency resources (e.g., partial frequency sounding), additional parameters and configurations may be introduced, along with associated control signaling. Control signaling may be transmitted to the UE that indicates various sets of resources, each set of resources being associated with a value of a partial frequency parameter. The UE may also receive signaling indicating the value of the partial frequency parameter that the UE is to use, thereby designating the resources to be used for transmitting the SRS. In some cases, indications of a frequency offset or a frequency offset pattern may be received by the UE to further designate particular resources for partial frequency sounding.

Aspects of the disclosure are initially described in the context of wireless communications systems. Aspects of the disclosure are then illustrated by resource diagrams, resource tables, and a process flow. Aspects of the disclosure are further illustrated by and described with reference to apparatus diagrams, system diagrams, and flowcharts that relate to configuration and indication of resources for partial frequency sounding.

Figure 1:
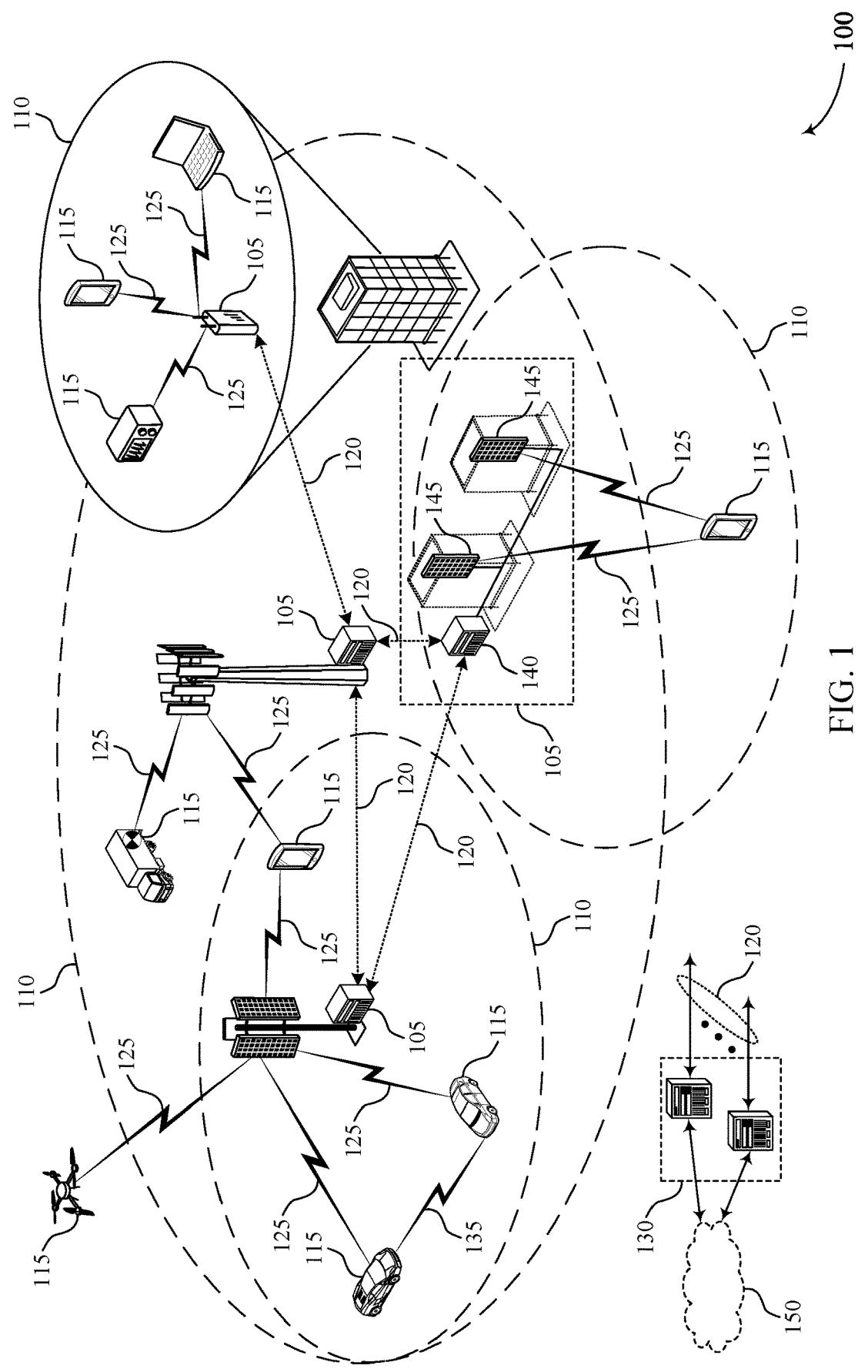
FIG. 1 illustrates an example of a wireless communications system that supports configuration and indication of resources for partial frequency sounding (PFS) in accordance with aspects of the present disclosure.

FIG. 1 illustrates an example of a wireless communications system 100 that supports configuration and indication of resources for partial frequency sounding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UE 115 may receive, from the base station 105, an indication of a configuration identifying a set of time and frequency resources for transmission of sounding reference signals. The set of time and frequency resources may include a plurality of subsets of time and frequency resources, and each subset of time and frequency resources of the plurality of subsets of time and frequency resources may be associated with a corresponding value of a plurality of values of a partial frequency (PF) parameter. The UE 115 may receive control signaling that may indicate a value of the PF parameter of the plurality of values. The UE 115 may transmit a sounding reference signal on a subset of time and frequency resources of the plurality of subsets of time and frequency resources that may correspond to the value of the PF parameter indicated by the received control signaling.

FIG. 2 illustrates an example of a wireless communications system 200 that supports configuration and indication of resources for partial frequency sounding in accordance with aspects of the present disclosure. The wireless communications system 200 may include a base station 105-*a*, and a UE 115-*a*. The base station 105-*a* may be an example of the base station 105 discussed in relation to FIG. 1, and the UE 115-*a* may be an example of the UE 115 discussed in relation to FIG. 1. The UE 115-*a* may be within a service area 217 of the base station 105-*a* in which the base station 105-*a* and the UE 115-*a* may communicate.

In some examples, the UE 115-*a* may receive a configuration indication 220 for partial frequency sounding (PFS). In some examples, the configuration indication 220 may identify, indicate, or select a set of time and frequency resources to be used for transmitting the SRS 230. Such a set of time and frequency resources may include one or more subsets of time and frequency resources that may be used for transmitting an SRS 230. In some examples, each of the subsets of time and frequency resources may be associated with a value of a PF parameter. The PF parameter may be used to identify, indicate, or select a subset of time and frequency resources that corresponds to one or more values of the PF parameter. For example, the PF parameter may bear a value of 1, which may correspond to a group of one or more time and frequency resources to be used for transmitting an SRS 230. In some examples, the PF parameter may be configured per SRS resource and, in some examples, if the PF parameter is not present, a default value for the PF parameter may be assumed. For example, a default value for the PF parameter may be set to 1. In some examples, the PF parameter may be defined at an SRS resource set level. In such examples, all SRS resources within the resource set may then have the same PF value.

In some examples, the PF value may be configured through RRC. For example, the PF value may be a single RRC configured value of PF. In some examples, multiple PF values may be configured through RRC. For example, an RRC configuration may include a list of PF values, such as [2, 4, 8]. In some examples, an L1 or L2 indication may be used to select a single value. For example, the UE 105-*a* may receive signaling (e.g., downlink control information (DCI) or MAC control element MAC-CE) to indicate, identify, or select a PF value. In some examples, the UE may receive signaling via a non-scheduling DCI format (e.g., format 0_1 or 0_2). In some examples, the UE may receive signaling including one or more repurposed bit fields (e.g., a frequency domain resource assignment (FDRA) field) to indicate, identify, or select a PF value. In some examples, various PF values may be used (e.g., one PF value for each SRS resource, or one PF value for each SRS set).

In some examples, the UE 115-*a* may receive control signaling 225 that indicates a value of the PF parameter. For example, the UE 115-*a* may receive a PF value of 2, which may indicate a group of one or more time and frequency resources over which the UE 115-*a* is to transmit one or more SRSs 230. In some examples, such a group of time and frequency resources may correspond to one of the subsets of time and frequency resources that form the set of time and frequency resources. In some examples, such subsets of time and frequency resources may include time and frequency resources that include a portion of frequency resources that may be assigned to a corresponding time resource. For example, if frequency resources corresponding to a time resource include a number of physical resource blocks (PRBs) (e.g., a value labeled $m_{srs,b}$), a subset of time and frequency resources corresponding to a PF value (e.g., labeled as $P_F$) may include a portion of the PRBs (e.g., a portion of $m_{srs,b}$). In some examples, the particular portion of resources used for PFS may be based on the PF value (e.g., the frequency resources may be determined based on $1/P_F\, m_{srs,b}$).

In some examples. the UE 115-*a* may transmit an SRS 230 over a set of time and frequency resources that corresponds to the value of the PF parameter that was indicated, identified, or selected in the control signaling. For example, if the PF value indicated, identified, or selected in the control signaling 225 was 2, then the UE may determine that the SRS 230 is to be transmitted over a set of time and frequency resources corresponding to the PF value of 2, and may then utilize the set of time and frequency resources to transmit the SRS 230.

Figures 3A, 3B:
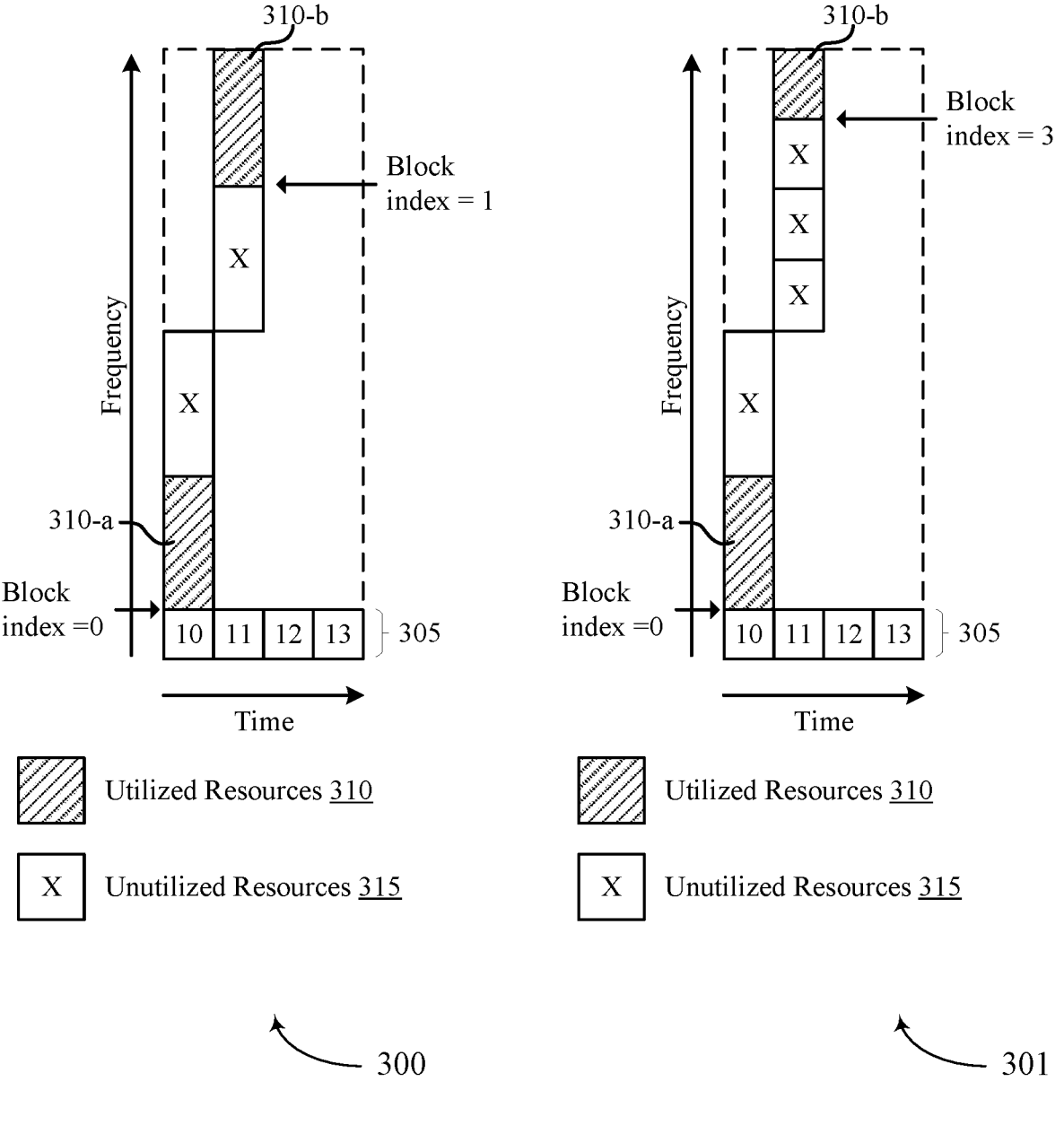
FIGS. 3A and 3B illustrate examples of time and frequency resource configurations that support configuration and indication of resources for PFS in accordance with aspects of the present disclosure.

FIGS. 3A and 3B illustrate examples of time and frequency resource configurations 300 and 301 that support configuration and indication of resources for partial frequency sounding in accordance with aspects of the present disclosure. In FIGS. 3A and 3B, the horizontal axis is representative of time, and the vertical axis is representative of frequency. The symbol identifiers 305 identify symbols or time resources where symbols may be placed. While the example depicts time and frequency resources, other particular time and frequency resources are also contemplated by this disclosure, and the disclosure is not limited to the particular examples discussed herein.

In some examples, a UE (such as UE 115-*a* as discussed in relation with FIG. 2) may receive signaling indicating a PF value associated with a subset of time and frequency resources for PFS. FIG. 3A shows one example of utilized resources 310 that may, in some examples, correspond with the subset of time and frequency resources. Resources that may not be used for PFS may include unutilized resources 315. In such an example, the PF value may be equal to 2, such that an amount of frequency resources corresponding to the subset of time and frequency resources (and also corresponding to the particular PF value) occupies a proportional amount of each portion of frequency resources that would otherwise be used for a particular time resource. For example, the subset of resources may be determined by $1/P_F\, m_{srs,b}$ and $P_F{=}2$, giving an amount of utilized resources 310 for each time resource as $\frac{1}{2}m_{srs,b}$ (i.e., allocating one-half of the frequency resources for PFS).

In some examples, frequency hopping may also be utilized together with PFS. In some frequency hopping schemes, the utilized resources 310 may be associated with different indices of PRBs associated with different time resources. For example, as shown in FIG. 3A, utilized resource 310-*a* is associated with a block index of 0 during the time resource labeled as 10, and utilized resource 310-*b* is associated with a block index of 1 during the time resource labeled as 11. Thus, in such an example, a frequency hopping pattern may be described as {0,1}, since an earlier time resource is associated with a block index of 0 and the later time resource is associated with a block index of 1. In some examples, each frequency hop may be associated with the same PF value (e.g., $P_F{=}2$, as shown in FIG. 3A).

FIG. 3B shows another example of frequency hopping and PF values. In some examples, different frequency hops may be associated with different PF values. For example, FIG. 3B shows that the resources associated with the symbol identifier 305 labeled as 10 may be associated with a PF value of 2, and the resources associated with the symbol identifier 305 labeled as 11 may be associated with a PF value of 4. In this example, the earlier time resource may be associated with a block index of 0, and the later time resource may be associated with a block index of 3, which may be in accordance with a frequency hopping pattern (e.g. a frequency hopping pattern of {0, 3}). Various different combinations of indices, frequency hops, frequency resources, time resources, and associated parameters are possible, and should not be limited to the particular examples discussed herein.

In some examples, the length of the SRS sequence to be transmitted may be modified. For example, the length of the SRS sequence to be transmitted may be scaled by a PF value. In one example, the length of the SRS may be given by an expression, and the expression may be scaled by the PF value (e.g., [expression]*1/$P_F$). Depending on the particular PF value that is used, the length of the SRS to be transmitted may therefore be scaled by different amounts.

FIGS. 4A and 4B illustrate examples of time and frequency resource configurations 400 and 401 that support configuration and indication of resources for partial frequency sounding in accordance with aspects of the present disclosure. In some examples, the UE may receive an indication, identification, or selection of a frequency offset. In some examples, the frequency offset may offset a reference point (e.g., a starting point), in the frequency domain, of frequency domain resources to be used. For example, and as shown in FIGS. 4A and 4B, a frequency offset may be applied. In FIG. 4A, no frequency offset is applied, and the utilized resources 405-*a* used for the SRS may begin at a starting point 410-*a* that is not offset. In FIG. 4B, a frequency offset may be applied, and the utilized resources 405-*b* may begin at an starting point 410-*b* that has been adjusted by the applied frequency offset.

In some examples, each SRS symbol may be capable of having a different frequency offset (e.g., a frequency offset may be applied to each symbol individually, and each frequency offset for each symbol may be different from others). In other examples, a frequency offset may be applied uniformly across symbols within a slot. In some examples, different slots may have different frequency offsets applied to the resources of each slot.

In some examples, a base station (e.g., the base station 105-*a*) may configure a UE (e.g., the UE 115-*a*) with two values of a frequency resource configuration parameter (e.g., a parameter indicating a frequency domain shift such as freqDomainShift, or a parameter indicating a frequency domain position such as freqDomainPosition). In some examples, the base station 105-*a* may configure a default value when no PFS is to be performed. For example, FIG. 4A may be an example case of when the default value is used and no PFS is to be performed. In some examples, the base station 105-*a* may configure a second value for the frequency resource configuration parameter when the UE 115-*a* is to perform PFS. For example, FIG. 4B may be an example case of when the second value is used and PFS is to be performed. In some examples, activation or deactivation of PFS via a frequency resource configuration parameter may be performed through DCI (e.g., non-scheduling DCI). In some examples, activation or deactivation of PFS via a frequency resource configuration parameter may be performed through MAC-CE. In some examples, a base station 105-*a* or a network may configure two values of a PF parameter (e.g., 1 and 2), and these values may have a one-to-one relationship (or other relationship) with a frequency offset. In such examples, the base station 105-*a* or network may therefore impliedly indicate a frequency offset by configuring a value of a PF parameter, or by other means.

Figures 5A, 5B:
FIGS. 5A and 5B illustrate examples of frequency offset pattern configurations that support configuration and indication of resources for PFS in accordance with aspects of the present disclosure.

FIGS. 5A and 5B illustrate examples of frequency offset pattern configurations 500 and 501 that support configuration and indication of resources for partial frequency sounding in accordance with aspects of the present disclosure. The frequency offset pattern indicates the block index shown in FIGS. 3A and 3B.

FIG. 5A illustrates an example of a semi-static offset pattern configuration. In some examples, a UE 115-*a* may receive indications, identifications, or selections of a configuration via RRC. In some examples, the configuration received by the UE 115-*a* may include one or more frequency offset patterns 515. In some examples, the frequency offset patterns 515 may indicate block indices (e.g., the block indices discussed in reference to FIGS. 3A and 3B) that are used as reference points in the frequency domain to determine at which points in frequency resources the utilized resources are to be located for SRS transmission by the UE.

In some examples, the frequency offset pattern 515 that the UE 115-*a* is to use for PFS may be semi-statically configured in the configuration received by the UE 115-*a*. In some examples, each frequency offset pattern may correspond to a PF value 505, a number of symbols 510 used for the SRS transmission, or both. The PF value 505 may be an example of other PF values as discussed herein. The number of symbols 510 may be a number of symbols that are to be transmitted (e.g., as part of a repetition scheme for SRS transmissions). For example, the UE 115-*a* may receive a configuration (e.g., via RRC) indicating a frequency offset pattern of 0,1 associated with a PF value 505 of 2 and a number of symbols 510 to be transmitted of 2. Thus, the UE 115-*a* may determine that, based on the PF value 505 and the number of symbols 510 that the UE 115-*a* is to transmit the SRS using the indicated 0,1 frequency offset pattern 515.

FIG. 5B illustrates an example of a dynamic offset pattern configuration. In some examples, the frequency offset pattern 515 that the UE 115-*a* is to use for PFS may be dynamically configured. For example, the UE 115-*a* may receive a configuration (e.g., an RRC configuration) that indicates a plurality of frequency offset patterns 515 that may correspond to each PF value 505, a number of symbols 510 to be transmitted (e.g., as part of a repetition scheme for SRS transmission), or both. In addition, a base station 105-*a* may indicate (e.g., to the UE 115-*a*) a particular PF value 505 to be used for SRS transmissions. In some examples, the base station 105-*a* may also indicate a particular frequency offset pattern 515 from the plurality of frequency offset patterns 515 that is associated with the indicated PF value 505. Alternatively, or additionally, the base station 105-*a* may indicate parameters related to a frequency offset pattern 515 of the plurality of frequency offset patterns 515 to the UE 115-*a*. In some examples, the base station 105-*a* may indicate the PF value 505, a frequency offset pattern 515, a number of symbols 510, related parameters (e.g., parameters related to the frequency offset pattern), or a combination thereof, through DCI. In some examples, the base station 105-*a* may utilize one or more reserved bit fields in a DCI for such indications, or the base station 105-*a* may utilize one or more repurposed reserved bits in a DCI for such indications.

Figures 6A, 6B, 6C:
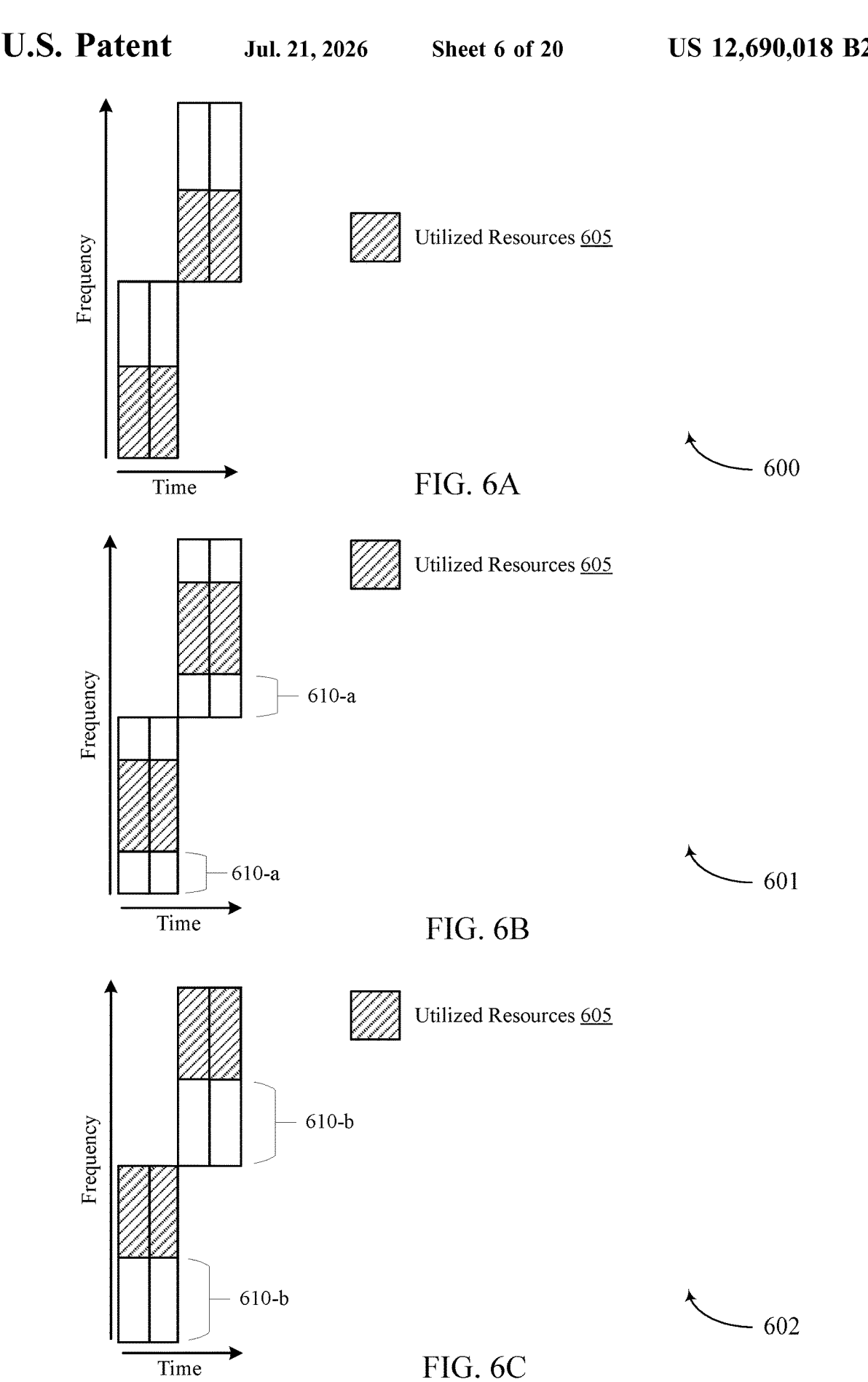
FIGS. 6A, 6B, and 6C illustrate examples of frequency offset indication configurations with frequency hopping that support configuration and indication of resources for PFS in accordance with aspects of the present disclosure.

FIGS. 6A, 6B, and 6C illustrate examples of frequency offset indication configurations 600, 601, and 602, respectively, that support configuration and indication of resources for partial frequency sounding in accordance with aspects of the present disclosure.

In some examples, a set or subset of time and frequency resources may be designated for use with PFS. In some examples, varying frequency offsets (e.g., as described herein at least in relation to FIGS. 4 and 5) may be configured in combination with frequency hopping approaches (e.g., as described herein at least in relation to FIGS. 3A and 3B).

In some examples, a base station 105-*a* or network may configure a fixed frequency offset for each frequency hop.

For example, in each of FIGS. 6A, 6B, and 6C, the frequency offset is the same for the first hop and the second hop. In FIG. 6A, the base station 105-*a* may configure no frequency offset. In FIG. 6B, the base station 105-*a* may configure a frequency offset 610-*a* for each frequency hop. In FIG. 6C, the base station 105-*a* may configure a frequency offset 610-*b* that is different from the frequency offset 610-*a*.

In some examples, the base station 105-*a* may configure a different frequency offset for different UEs (e.g., UE 115-*a*). For example, the base station 105-*a* may configure a first UE with no frequency offset (e.g., as shown in FIG. 6A), and the base station 105-*a* may configure a second UE with a frequency offset (e.g., the frequency offset 610-*b* as shown in FIG. 6C). For example, the base station 105-*a* may configure these various frequency offsets using one or more frequency domain configuration parameters (e.g., n shift or freqDomainShift parameters in RRC). In this way, resource utilization across multiple UEs may be increased while at the same time reducing interference. For example, different UEs may utilize the utilized resources 605 in FIG. 6A and the utilized resources in FIG. 6C for transmission of SRSs simultaneously, to increase utilization and decrease interference.

FIGS. 7A, 7B, 7C, and 7D illustrate examples of frequency offset indication configurations 700, 701, 702, and 703, respectively that support configuration and indication of resources for partial frequency sounding in accordance with aspects of the present disclosure.

In some examples, a set or subset of time and frequency resources may be designated for use with PFS. In some examples, varying frequency offsets (e.g., as described herein at least in relation to FIGS. 4 and 5) may be configured in combination with frequency hopping approaches (e.g., as described herein at least in relation to FIGS. 3A and 3B).

Figures 7A, 7B, 7C, 7D:
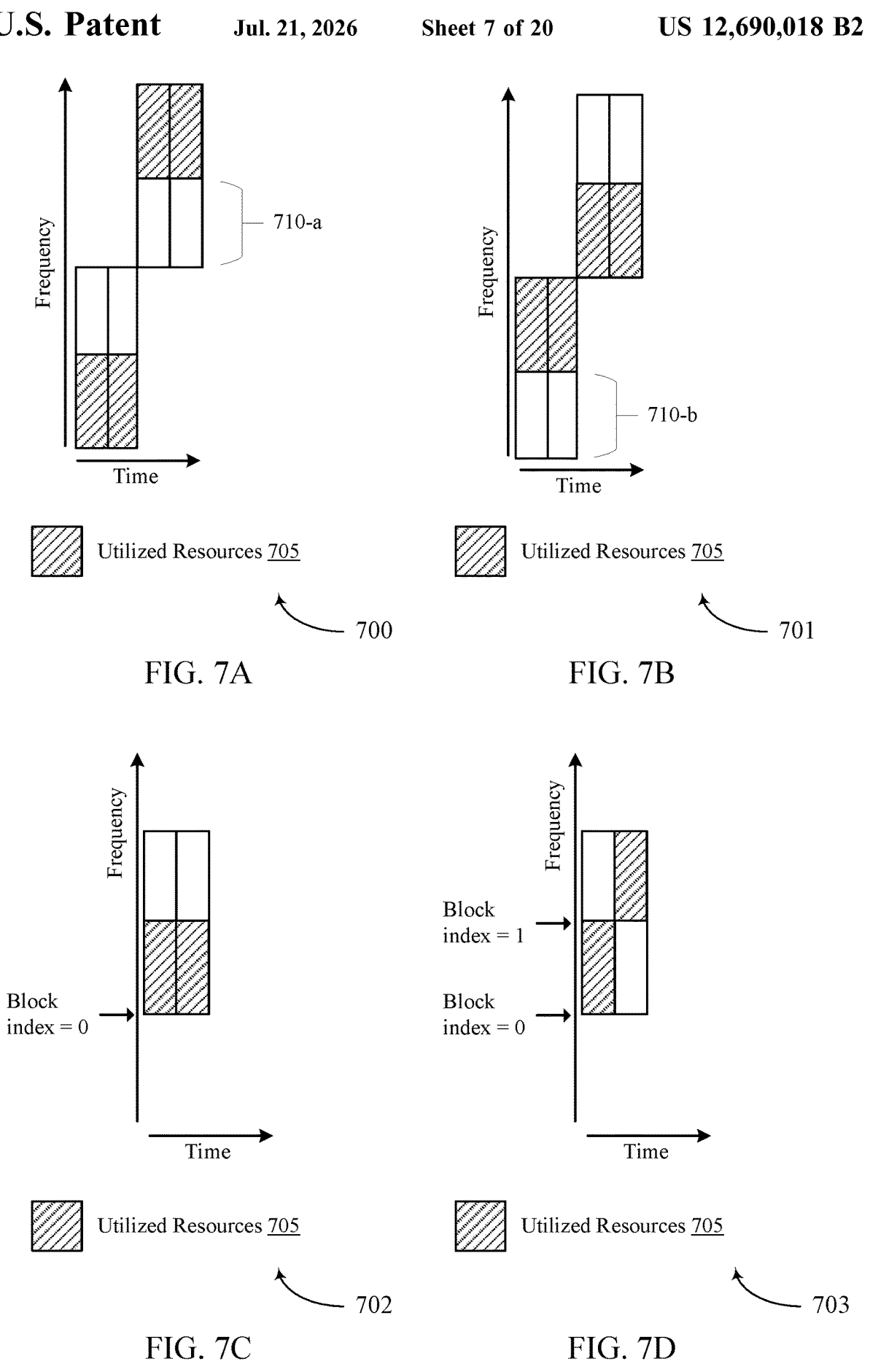
FIGS. 7A, 7B, 7C, and 7D illustrate examples of a frequency offset indication configuration with frequency hopping that supports configuration and indication of resources for PFS in accordance with aspects of the present disclosure.

In some examples, a base station 105-*a* or network may configure different frequency offsets for different frequency hops. In some examples, each frequency hop may have a different frequency offset, while in other examples, some frequency offsets may be repeated for different frequency hops. For example, in each of FIGS. 7A and 7B, the frequency offset may be different for the first hop and the second hop. In FIG. 7A, the base station 105-*a* may configure no frequency offset for the first hop, and may further configure a frequency offset 710-*a* for the second hop. In FIG. 7B, the base station 105-*a* may configure a frequency offset 710-*b* for the first frequency hop, and configure no frequency offset for the second frequency hop.

In some examples, the frequency offset pattern used (e.g., the pattern of frequency offsets used for each frequency hop) may be based on the PF value, an amount of available frequency resources (e.g., a number of PRBs available), an SRS counter (e.g., $n_{srs}$), a symbol index, a slot index, a number of SRS symbols, or a combination thereof. In some examples, the base station 105-*a* may configure the various offset patterns for various UEs to reduce or avoid overlapping of SRS resources for the various UEs.

In some cases, the UE is configured with intra-slot frequency hopping with repetition. In some aspects when the UE is configured for partial frequency sounding, the UE is configured to use the same frequency offset across the repetition of the same hop (e.g. as shown in FIG. 7C). In some other examples, the UE may be configured with different frequency offsets across the repetition of the same hop (e.g. as shown in FIG. 7D).

Figure 8:
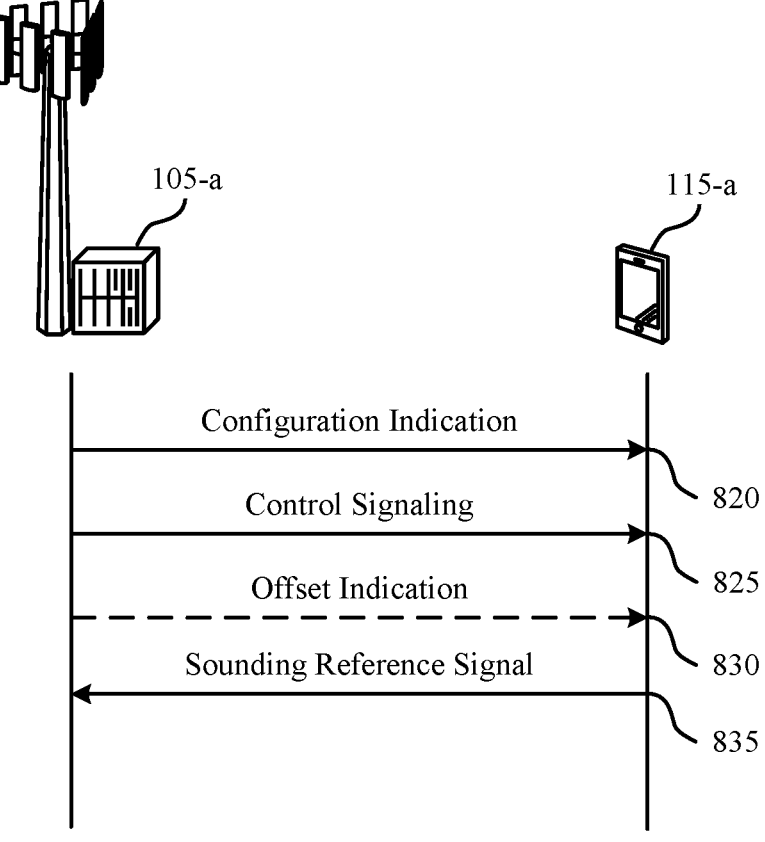
FIG. 8 illustrates an example of a process flow that supports configuration and indication of resources for PFS in accordance with aspects of the present disclosure.

FIG. 8 illustrates an example of a process flow 800 that supports configuration and indication of resources for partial frequency sounding in accordance with aspects of the present disclosure. The process flow 800 may include operations, signaling, or other procedures performed by base station 105-*a* and UE 115-*a*.

At 820, the UE may receive an indication of a configuration identifying a set of time and frequency resources for transmission of SRSs, the set of time and frequency resources including a plurality of subsets of time and frequency resources, wherein each subset of time and frequency resources of the plurality of subsets of time and frequency resources is associated with a corresponding value of a plurality of values of a PF parameter, and a plurality of the frequency offset pattern for the subset of time and frequency resources. For example, the UE may receive such a configuration as described in relation to FIGS. 2-7D as described herein.

At 825, the UE may receive control signaling indicating a value of the PF parameter of the plurality of values. For example, the UE may receive control signaling indicating that the PF value is 2, as described herein in relation to at least FIGS. 3A and 3B and FIGS. 5A and 5B.

In some cases, the UE may receive a value of the PF parameter of the plurality of values of the PF parameter for each time resource of the subset of time and frequency resources on which the SRS is transmitted. For example, the UE may receive such a value for each SRS symbol that the UE is to transmit.

At 830, the UE may receive an indication of a frequency offset associated with the subset of time and frequency resources that corresponds to the value of the PF parameter indicated by the received control signaling. For example, the UE may receive such a frequency offset as described herein in relation to FIGS. 4-7D.

In some cases, receiving an indication of the frequency offset may include receiving an indication of a frequency offset for each symbol of the transmitted SRS. In some cases, receiving an indication of the frequency offset may include receiving an indication of a frequency offset for each time resource slot at least partially occupied by the transmitted SRS.

In some cases, the UE may receive control signaling indicating a frequency offset pattern for each value of the PF parameter. In some such cases, receiving the indication of the frequency offset may include receiving an indication of a frequency offset pattern, the frequency offset pattern based on the indicated value of the PF parameter, a number of symbols of the sounding resource signal, and the control signaling indicating a frequency offset pattern for each value of the PF parameter. For example, such an offset pattern may be based on or associated with a PF value, a number of symbols, or both as discussed in relation to FIG. 5A.

In some cases, the UE may receive control signaling indicating a plurality of frequency offset patterns for each value of the PF parameter. In some such cases, receiving the indication of the frequency offset may include receiving an indication of a frequency offset pattern, the frequency offset pattern based on the indicated value of the PF parameter and receiving control signaling indicating a frequency offset pattern of the plurality of frequency offset patterns corresponding to the indicated value of the PF parameter. For example, such an offset pattern may be based on or associated with a PF value, a number of symbols, or both as discussed in relation to FIG. 5B.

In some cases, the UE may receive an indication of a single frequency offset for the subset of time and frequency resources on which the SRS is transmitted. In some cases, receiving the indication of the single frequency offset may include receiving an indication of a frequency resource configuration value indicating a frequency domain shift in the subset of time and frequency resources on which the SRS is transmitted.

In some cases, receiving the indication of the frequency offset may include receiving an indication of a frequency offset for each time resource of the subset of time and frequency resources on which the SRS is transmitted. In some cases, receiving the indication of the frequency offset for each time resource may include receiving an indication of a frequency resource configuration value for each time resource indicating a frequency domain shift in the subset of time and frequency resources on which the SRS is transmitted.

In some cases, the UE may receive an indication of a frequency offset pattern, the frequency offset pattern being based on the indicated value of the PF parameter, a number of physical resource blocks, a SRS counter, a symbol index, a slot index, a number of SRS symbols, or a combination thereof. For example, such an offset pattern may be an example of the offset pattern discussed in relation to one or more of FIG. 7A, 7B, 7C, or 7D.

In some cases, the UE may receive control signaling indicating a frequency resource configuration value indicating a frequency domain shift in the subset of time and frequency resources on which the SRS is transmitted or a frequency domain position reference point in the subset of time and frequency resources on which the SRS is transmitted.

At 835, the UE may transmit a SRS on a subset of time and frequency resources of the plurality of subsets of time and frequency resources that corresponds to the value of the PF parameter indicated by the received control signaling.

In some cases, transmitting the SRS is based on the received value of the PF parameter for each time resource. In some cases, transmitting the SRS is based on the indicated frequency offset. In some cases, transmitting the SRS may include receiving an indication of a length of the SRS, the length of the SRS based on the value of the PF parameter indicated by the received control signaling. For example, the length of the SRS may be scaled based on the PF parameter, as discussed in relation to FIGS. 3A and 3B.

Figure 9:
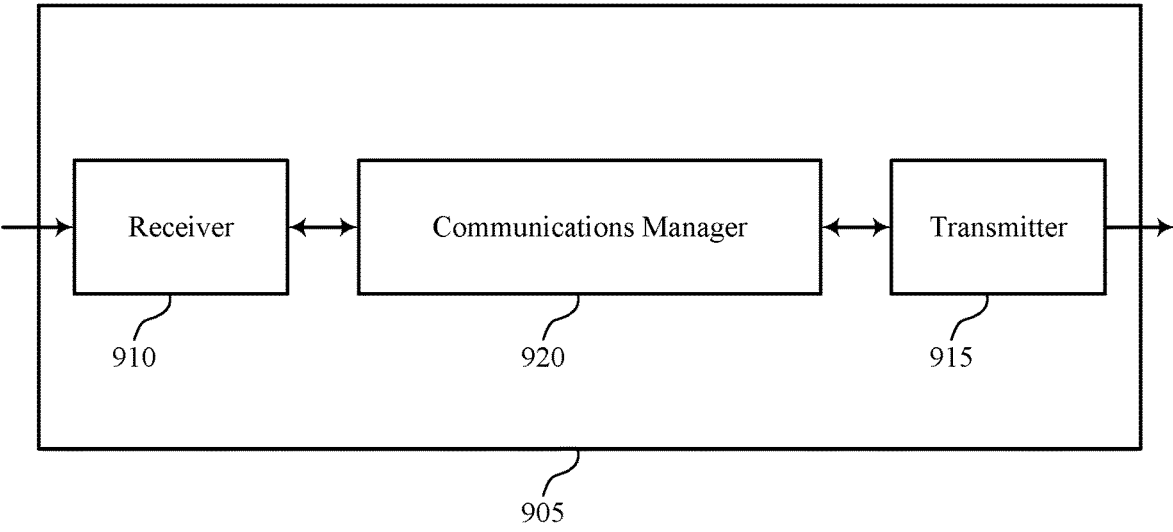
FIGS. 9 and 10 show block diagrams of devices that support configuration and indication of resources for PFS in accordance with aspects of the present disclosure.

FIG. 9 shows a block diagram 900 of a device 905 that supports configuration and indication of resources for partial frequency sounding in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to configuration and indication of resources for partial frequency sounding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to configuration and indication of resources for partial frequency sounding). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of configuration and indication of resources for partial frequency sounding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving an indication of a configuration identifying a set of time and frequency resources for transmission of sounding reference signals, the set of time and frequency resources including a set of multiple subsets of time and frequency resources, where each subset of the set of multiple subsets of time and frequency resources of the set of multiple subsets of time and frequency resources is associated with a corresponding value of a set of multiple values of a partial frequency parameter. The communications manager 920 may be configured as or otherwise support a means for receiving control signaling indicating a value of the partial frequency parameter of the set of multiple values. The communications manager 920 may be configured as or otherwise support a means for transmitting a sounding reference signal on a subset of time and frequency resources of the set of multiple subsets of time and frequency resources that corresponds to the value of the partial frequency parameter indicated by the received control signaling.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, or more efficient utilization of communication resources.

Figure 10:
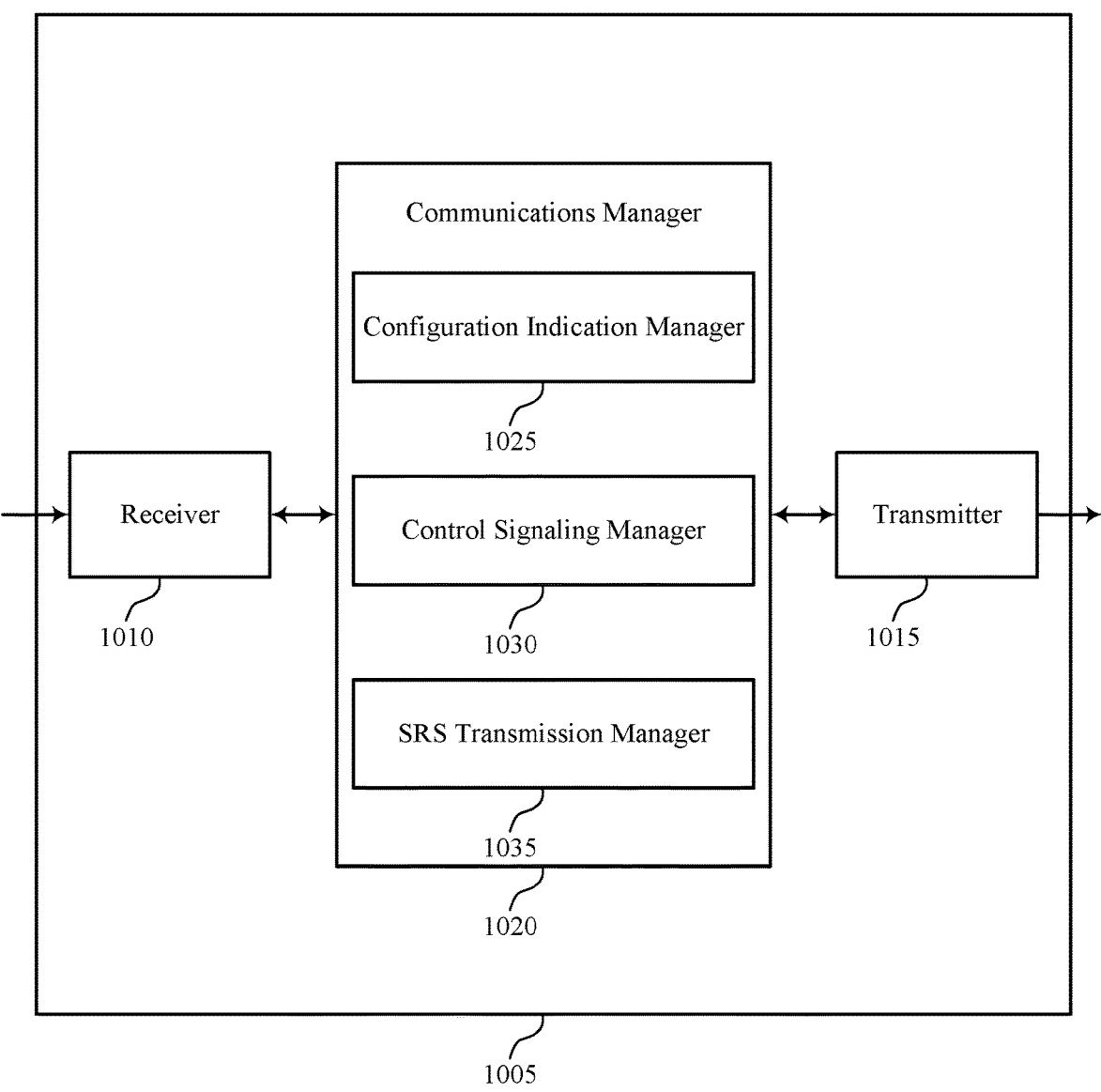

FIG. 10 shows a block diagram 1000 of a device 1005 that supports configuration and indication of resources for partial frequency sounding in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to configuration and indication of resources for partial frequency sounding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to configuration and indication of resources for partial frequency sounding). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of configuration and indication of resources for partial frequency sounding as described herein. For example, the communications manager 1020 may include a configuration indication manager 1025, a control signaling manager 1030, an SRS transmission manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The configuration indication manager 1025 may be configured as or otherwise support a means for receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The control signaling manager 1030 may be configured as or otherwise support a means for receiving control signaling indicating a value of the partial frequency parameter of the set of multiple values. The SRS transmission manager 1035 may be configured as or otherwise support a means for transmitting a sounding reference signal on a subset of time and frequency resources of the set of multiple subsets of time and frequency resources that corresponds to the value of the partial frequency parameter indicated by the received control signaling.

Figure 11:
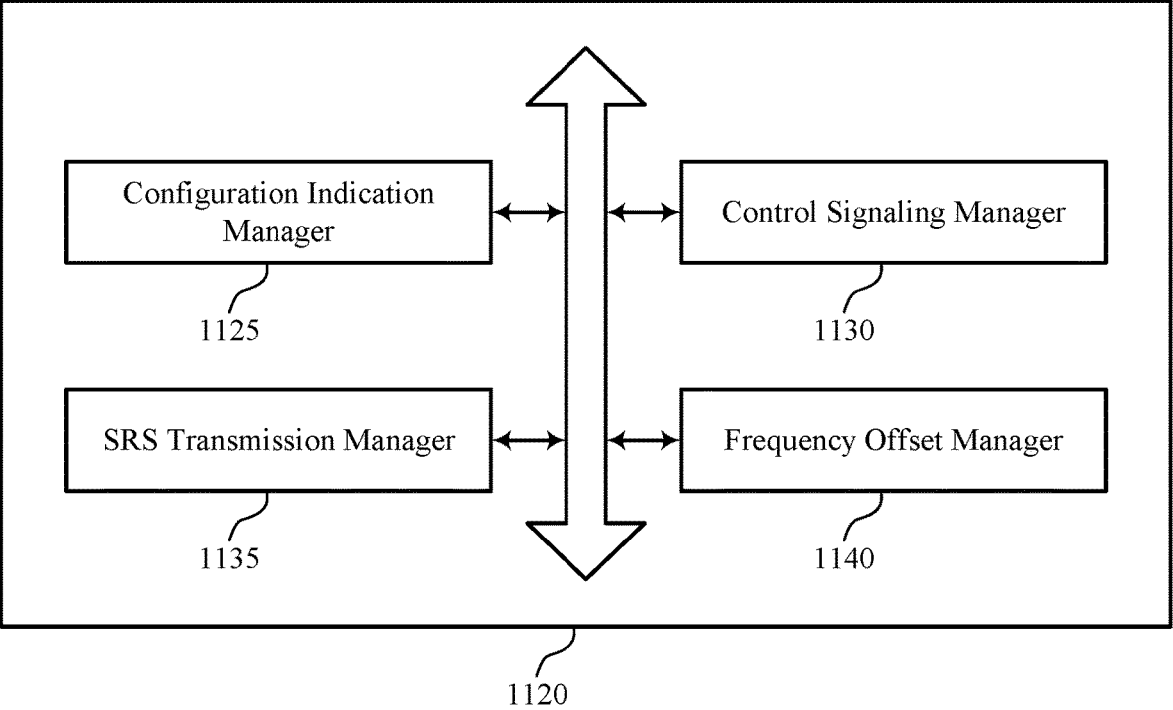
FIG. 11 shows a block diagram of a communications manager that supports configuration and indication of resources for PFS in accordance with aspects of the present disclosure.

FIG. 11 shows a block diagram 1100 of a communications manager 1120 that supports configuration and indication of resources for partial frequency sounding in accordance with aspects of the present disclosure. The communications manager 1120 may be an example of aspects of a communications manager 920, a communications manager 1020, or both, as described herein. The communications manager 1120, or various components thereof, may be an example of means for performing various aspects of configuration and indication of resources for partial frequency sounding as described herein. For example, the communications manager 1120 may include a configuration indication manager 1125, a control signaling manager 1130, an SRS transmission manager 1135, a frequency offset manager 1140, or any combination thereof. Each of these components may communicate, directly or indirectly, with one another (e.g., via one or more buses).

The communications manager 1120 may support wireless communications at a UE in accordance with examples as disclosed herein. The configuration indication manager 1125 may be configured as or otherwise support a means for receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The control signaling manager 1130 may be configured as or otherwise support a means for receiving control signaling indicating a value of the partial frequency parameter of the set of multiple values. The SRS transmission manager 1135 may be configured as or otherwise support a means for transmitting a sounding reference signal on a subset of time and frequency resources of the set of multiple subsets of time and frequency resources that corresponds to the value of the partial frequency parameter indicated by the received control signaling.

In some examples, receiving control signaling indicating the value of the partial frequency parameter includes receiving a value of the partial frequency parameter of the set of multiple values of the partial frequency parameter for each time resource of the subset of time and frequency resources on which the sounding reference signal is transmitted. In some examples, transmitting the sounding reference signal is based on the received value of the partial frequency parameter for each time resource.

In some examples, to support transmitting the sounding reference signal, the SRS transmission manager 1135 may be configured as or otherwise support a means for receiving an indication of a length of the sounding reference signal, the length of the sounding reference signal based on the value of the partial frequency parameter indicated by the received control signaling.

In some examples, the frequency offset manager 1140 may be configured as or otherwise support a means for receiving an indication of a frequency offset associated with the subset of time and frequency resources that corresponds to the value of the partial frequency parameter indicated by the received control signaling. In some examples, the SRS transmission manager 1135 may be configured as or otherwise support a means for where transmitting the sounding reference signal is based on the indicated frequency offset.

In some examples, to support receiving an indication of the frequency offset, the frequency offset manager 1140 may be configured as or otherwise support a means for receiving an indication of a frequency offset for each symbol of the transmitted sounding reference signal.

In some examples, to support receiving an indication of the frequency offset, the frequency offset manager 1140 may be configured as or otherwise support a means for receiving an indication of a frequency offset for each time resource slot at least partially occupied by the transmitted sounding reference signal.

In some examples, the frequency offset manager 1140 may be configured as or otherwise support a means for receiving control signaling indicating a frequency offset pattern for each value of the partial frequency parameter. In some examples, the frequency offset manager 1140 may be configured as or otherwise support a means for where receiving the indication of the frequency offset further includes receiving an indication of a frequency offset pattern, the frequency offset pattern based on the indicated value of the partial frequency parameter, a number of symbols of the sounding resource signal, and the control signaling indicating a frequency offset pattern for each value of the partial frequency parameter.

In some examples, the frequency offset manager 1140 may be configured as or otherwise support a means for receiving control signaling indicating a set of multiple frequency offset patterns for each value of the partial frequency parameter. In some examples, the frequency offset manager 1140 may be configured as or otherwise support a means for where receiving the indication of the frequency offset further includes receiving an indication of a frequency offset pattern, the frequency offset pattern based on the indicated value of the partial frequency parameter and receiving control signaling indicating a frequency offset pattern of the set of multiple frequency offset patterns corresponding to the indicated value of the partial frequency parameter.

In some examples, to support receiving the indication of the frequency offset, the frequency offset manager 1140 may be configured as or otherwise support a means for receiving an indication of a single frequency offset for the subset of time and frequency resources on which the sounding reference signal is transmitted.

In some examples, to support receiving the indication of the single frequency offset, the frequency offset manager 1140 may be configured as or otherwise support a means for receiving an indication of a frequency resource configuration value indicating a frequency domain shift in the subset of time and frequency resources on which the sounding reference signal is transmitted.

In some examples, to support receiving the indication of the frequency offset, the frequency offset manager 1140 may be configured as or otherwise support a means for receiving an indication of a frequency offset for each time resource of the subset of time and frequency resources on which the sounding reference signal is transmitted.

In some examples, to support receiving the indication of the frequency offset for each time resource, the frequency offset manager 1140 may be configured as or otherwise support a means for receiving an indication of a frequency resource configuration value for each time resource indicating a frequency domain shift in the subset of time and frequency resources on which the sounding reference signal is transmitted.

In some examples, the frequency offset manager 1140 may be configured as or otherwise support a means for receiving an indication of a frequency offset pattern, the frequency offset pattern being based on the indicated value of the partial frequency parameter, a number of physical resource blocks, a sounding reference signal counter, a symbol index, a slot index, a number of sounding reference signal symbols, or a combination thereof.

In some examples, the control signaling manager 1130 may be configured as or otherwise support a means for receiving control signaling indicating a frequency resource configuration value indicating a frequency domain shift in the subset of time and frequency resources on which the sounding reference signal is transmitted or a frequency domain position reference point in the subset of time and frequency resources on which the sounding reference signal is transmitted.

Figure 12:
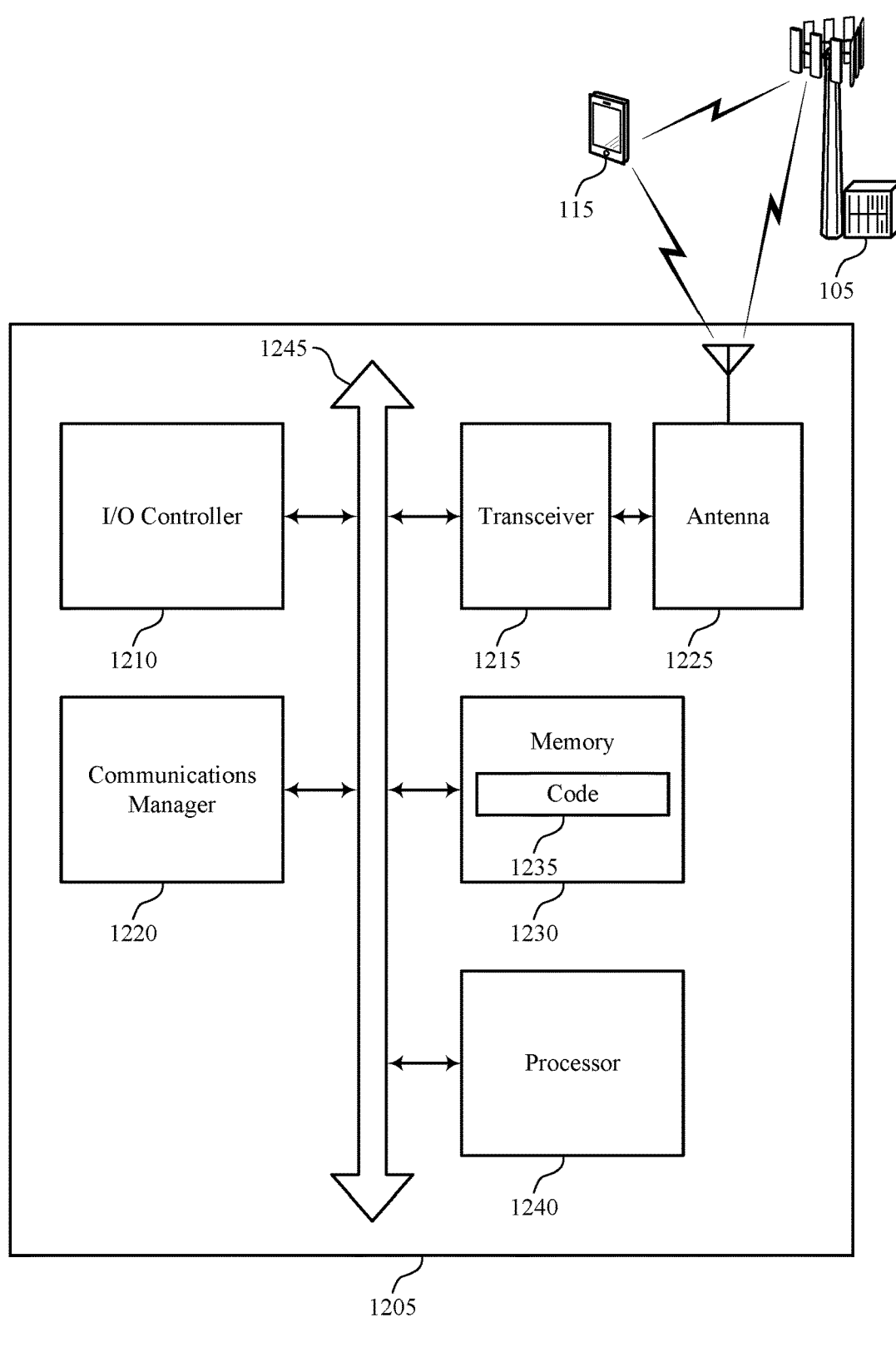
FIG. 12 shows a diagram of a system including a device that supports configuration and indication of resources for PFS in accordance with aspects of the present disclosure.

FIG. 12 shows a diagram of a system 1200 including a device 1205 that supports configuration and indication of resources for partial frequency sounding in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting configuration and indication of resources for partial frequency sounding). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The communications manager 1220 may be configured as or otherwise support a means for receiving control signaling indicating a value of the partial frequency parameter of the set of multiple values. The communications manager 1220 may be configured as or otherwise support a means for transmitting a sounding reference signal on a subset of time and frequency resources of the set of multiple subsets of time and frequency resources that corresponds to the value of the partial frequency parameter indicated by the received control signaling.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of configuration and indication of resources for partial frequency sounding as described herein, or the processor 1240 and the memory 1230 may be otherwise configured to perform or support such operations.

Figure 13:
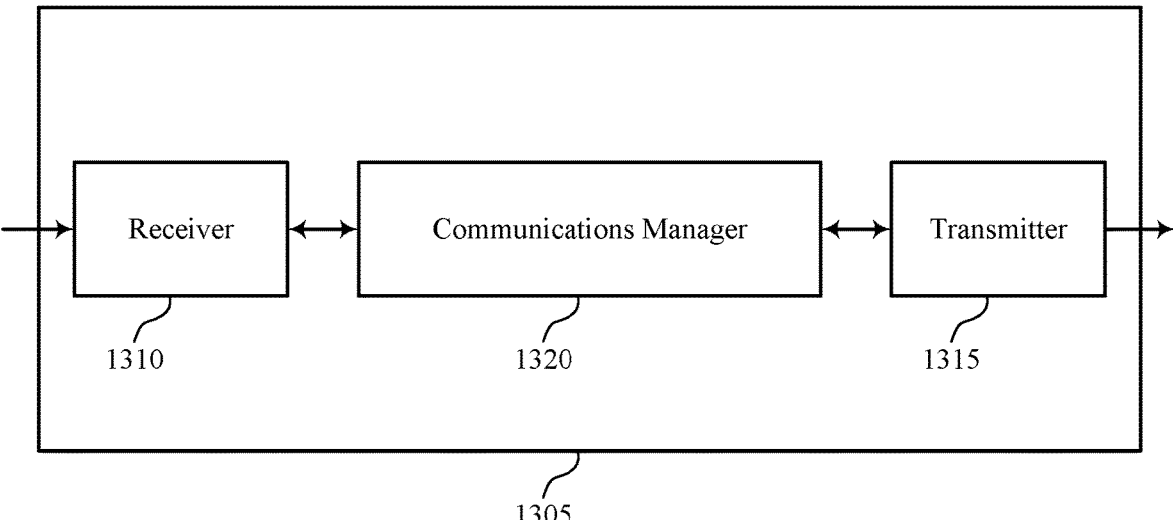
FIGS. 13 and 14 show block diagrams of devices that support configuration and indication of resources for PFS in accordance with aspects of the present disclosure.

FIG. 13 shows a block diagram 1300 of a device 1305 that supports configuration and indication of resources for partial frequency sounding in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to configuration and indication of resources for partial frequency sounding). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to configuration and indication of resources for partial frequency sounding). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of configuration and indication of resources for partial frequency sounding as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The communications manager 1320 may be configured as or otherwise support a means for transmitting control signaling indicating a value of the partial frequency parameter of the set of multiple values. The communications manager 1320 may be configured as or otherwise support a means for receiving a sounding reference signal on a subset of time and frequency resources of the set of multiple subsets of time and frequency resources that corresponds to the value of the partial frequency parameter indicated by the received control signaling.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced processing, reduced power consumption, or more efficient utilization of communication resources.

Figure 14:
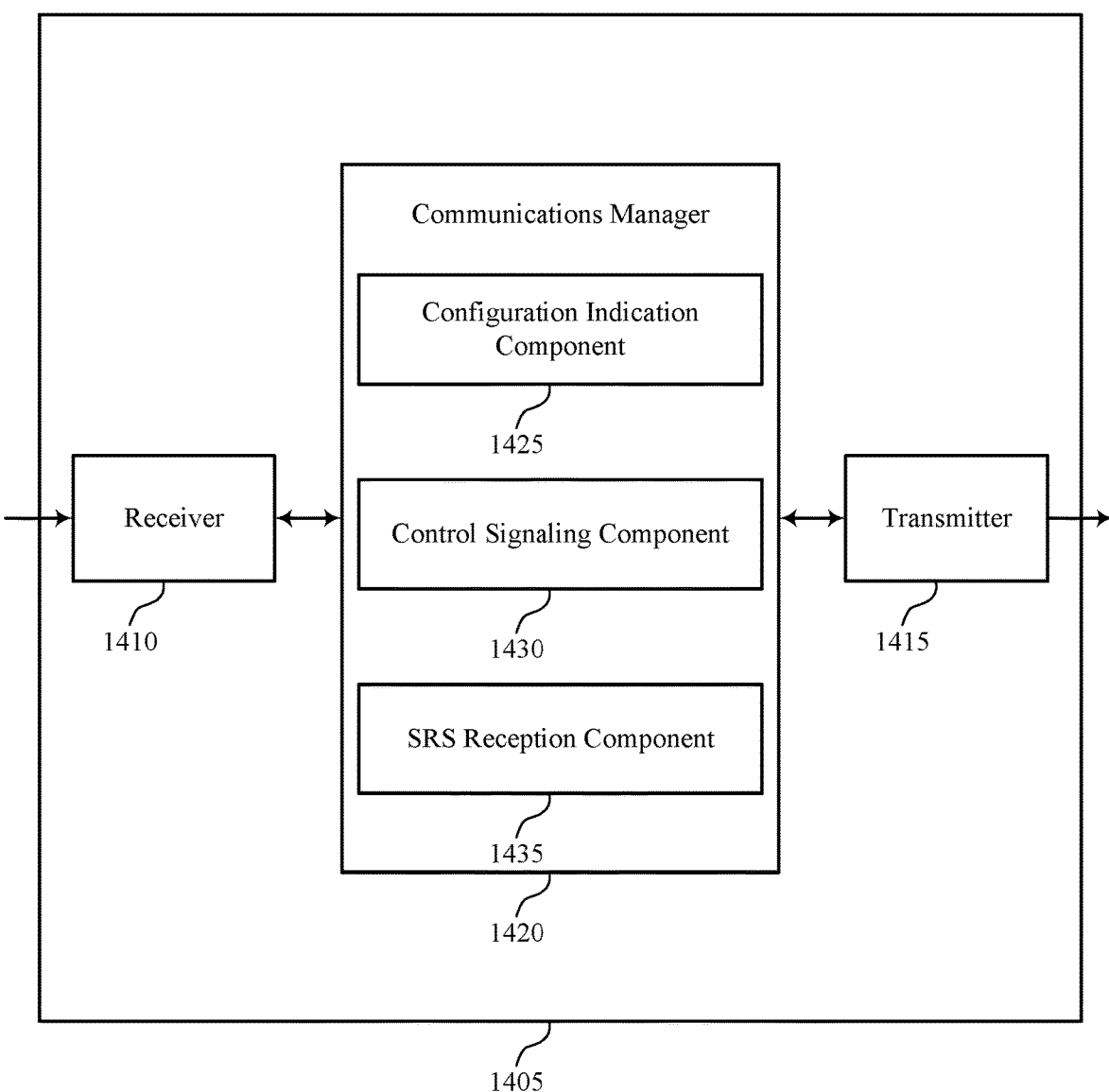

FIG. 14 shows a block diagram 1400 of a device 1405 that supports configuration and indication of resources for partial frequency sounding in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to configuration and indication of resources for partial frequency sounding). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to configuration and indication of resources for partial frequency sounding). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of configuration and indication of resources for partial frequency sounding as described herein. For example, the communications manager 1420 may include a configuration indication component 1425, a control signaling component 1430, an SRS reception component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The configuration indication component 1425 may be configured as or otherwise support a means for transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The control signaling component 1430 may be configured as or otherwise support a means for transmitting control signaling indicating a value of the partial frequency parameter of the set of multiple values. The SRS reception component 1435 may be configured as or otherwise support a means for receiving a sounding reference signal on a subset of time and frequency resources of the set of multiple subsets of time and frequency resources that corresponds to the value of the partial frequency parameter indicated by the received control signaling.

FIG. 15 shows a block diagram 1500 of a communications manager 1520 that supports configuration and indication of resources for partial frequency sounding in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of configuration and indication of resources for partial frequency sounding as described herein. For example, the communications manager 1520 may include a configuration indication component 1525, a control signaling component 1530, an SRS reception component 1535, a frequency offset component 1540, or any combination thereof. Each of these components may communicate, directly or indirectly, with one another (e.g., via one or more buses).

The communications manager 1520 may support wireless communications at a base station in accordance with examples as disclosed herein. The configuration indication component 1525 may be configured as or otherwise support a means for transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The control signaling component 1530 may be configured as or otherwise support a means for transmitting control signaling indicating a value of the partial frequency parameter of the set of multiple values. The SRS reception component 1535 may be configured as or otherwise support a means for receiving a sounding reference signal on a subset of time and frequency resources of the set of multiple subsets of time and frequency resources that corresponds to the value of the partial frequency parameter indicated by the received control signaling.

In some examples, transmitting control signaling indicating the value of the partial frequency parameter includes transmitting a value of the partial frequency parameter of the set of multiple values of the partial frequency parameter for each time resource of the subset of time and frequency resources on which the sounding reference signal is transmitted. In some examples, receiving the sounding reference signal is based on the transmitted value of the partial frequency parameter for each time resource.

In some examples, to support receiving the sounding reference signal, the SRS reception component 1535 may be configured as or otherwise support a means for transmitting an indication of a length of the sounding reference signal, the length of the sounding reference signal based on the value of the partial frequency parameter indicated by the received control signaling.

In some examples, the frequency offset component 1540 may be configured as or otherwise support a means for transmitting an indication of a frequency offset associated with the subset of time and frequency resources that corresponds to the value of the partial frequency parameter indicated by the transmitted control signaling. In some examples, the SRS reception component 1535 may be configured as or otherwise support a means for where receiving the sounding reference signal is based on the indicated frequency offset.

In some examples, to support transmitting an indication of the frequency offset, the frequency offset component 1540 may be configured as or otherwise support a means for transmitting an indication of a frequency offset for each symbol of the received sounding reference signal.

In some examples, to support transmitting an indication of the frequency offset, the frequency offset component 1540 may be configured as or otherwise support a means for transmitting an indication of a frequency offset for each time resource slot at least partially occupied by the received sounding reference signal.

In some examples, the frequency offset component 1540 may be configured as or otherwise support a means for transmitting control signaling indicating a frequency offset pattern for each value of the partial frequency parameter. In some examples, the frequency offset component 1540 may be configured as or otherwise support a means for where transmitting the indication of the frequency offset further includes transmitting an indication of a frequency offset pattern, the frequency offset pattern based on the indicated value of the partial frequency parameter, a number of symbols of the sounding resource signal, and the control signaling indicating a frequency offset pattern for each value of the partial frequency parameter.

In some examples, the frequency offset component 1540 may be configured as or otherwise support a means for transmitting control signaling indicating a set of multiple frequency offset patterns for each value of the partial frequency parameter. In some examples, the frequency offset component 1540 may be configured as or otherwise support a means for where transmitting the indication of the frequency offset further includes transmitting an indication of a frequency offset pattern, the frequency offset pattern based on the indicated value of the partial frequency parameter and transmitting control signaling indicating a frequency offset pattern of the set of multiple frequency offset patterns corresponding to the indicated value of the partial frequency parameter.

In some examples, to support transmitting the indication of the frequency offset, the frequency offset component 1540 may be configured as or otherwise support a means for transmitting an indication of a single frequency offset for the subset of time and frequency resources on which the sounding reference signal is received.

In some examples, to support transmitting the indication of the single frequency offset, the frequency offset component 1540 may be configured as or otherwise support a means for transmitting an indication of a frequency resource configuration value indicating a frequency domain shift in the subset of time and frequency resources on which the sounding reference signal is transmitted.

In some examples, to support transmitting the indication of the frequency offset, the frequency offset component 1540 may be configured as or otherwise support a means for transmitting an indication of a frequency offset for each time resource of the subset of time and frequency resources on which the sounding reference signal is transmitted.

In some examples, to support transmitting the indication of the frequency offset for each time resource, the frequency offset component 1540 may be configured as or otherwise support a means for transmitting an indication of a frequency resource configuration value for each time resource indicating a frequency domain shift in the subset of time and frequency resources on which the sounding reference signal is transmitted.

In some examples, the frequency offset component 1540 may be configured as or otherwise support a means for transmitting an indication of a frequency offset pattern, the frequency offset pattern being based on the indicated value of the partial frequency parameter, a number of physical resource blocks, a sounding reference signal counter, a symbol index, a slot index, a number of sounding reference signal symbols, or a combination thereof.

In some examples, the control signaling component 1530 may be configured as or otherwise support a means for transmitting control signaling indicating, in the subset of time and frequency resources on which the sounding reference signal is received, a frequency resource configuration value indicating a frequency domain or a frequency domain position reference point.

Figure 16:
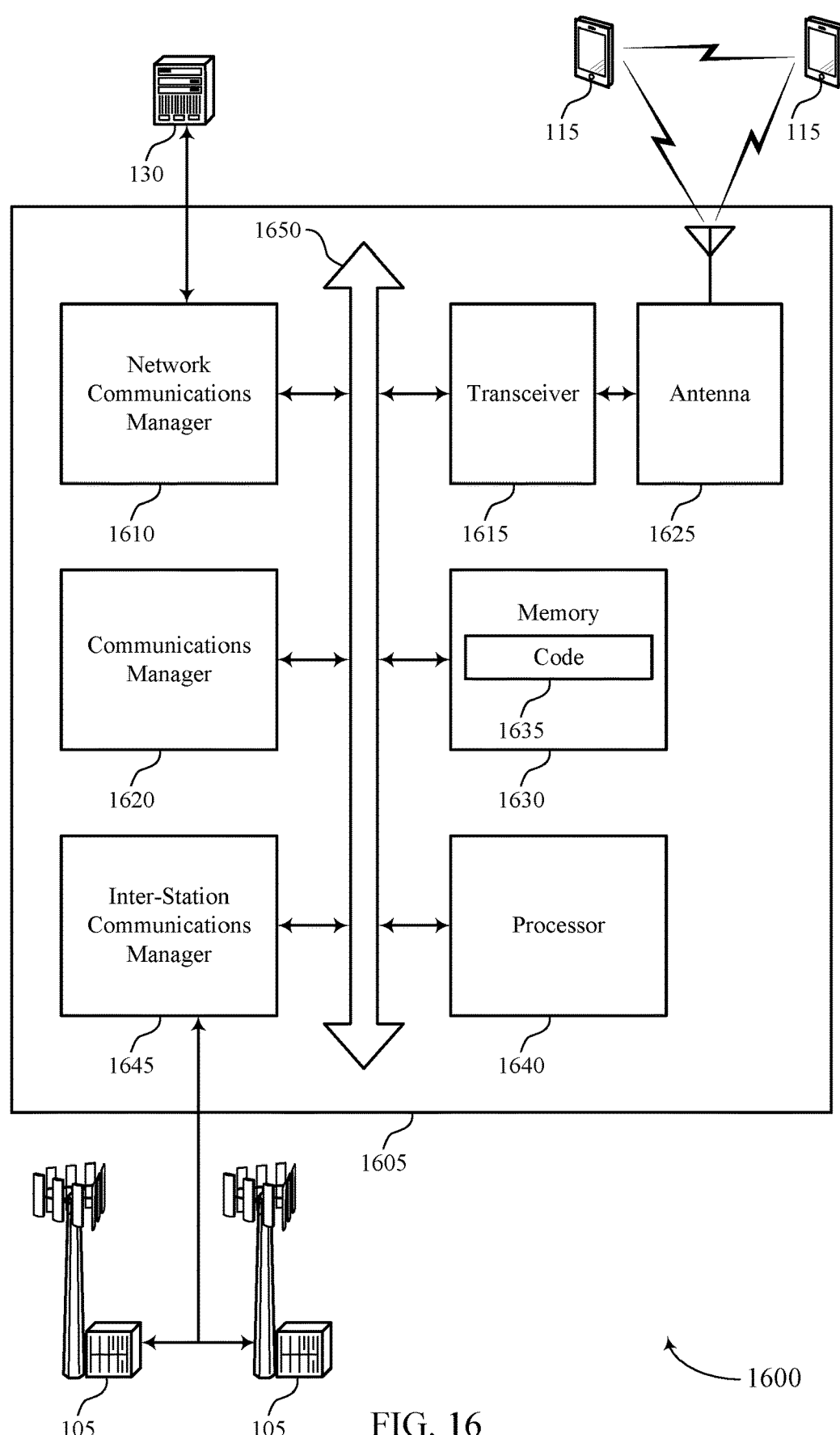
FIG. 16 shows a diagram of a system including a device that supports configuration and indication of resources for PFS in accordance with aspects of the present disclosure.

FIG. 16 shows a diagram of a system 1600 including a device 1605 that supports configuration and indication of resources for partial frequency sounding in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter

1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting configuration and indication of resources for partial frequency sounding). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for transmitting, to a UE, an indication of a configuration identifying a set of time and frequency resources for the UE to use to transmit sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The communications manager 1620 may be configured as or otherwise support a means for transmitting control signaling indicating a value of the partial frequency parameter of the set of multiple values. The communications manager 1620 may be configured as or otherwise support a means for receiving a sounding reference signal on a subset of time and frequency resources of the set of multiple subsets of time and frequency resources that corresponds to the value of the partial frequency parameter indicated by the received control signaling.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of configuration and indication of resources for partial frequency sounding as described herein, or the processor 1640 and the memory 1630 may be otherwise configured to perform or support such operations.

FIG. 17 shows a flowchart illustrating a method 1700 that supports configuration and indication of resources for partial frequency sounding in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The operations of 1705 may be performed in accordance with examples as disclosed herein. In some examples, aspects of the operations of 1705 may be performed by a configuration indication manager 1125 as described with reference to FIG. 11.

At 1710, the method may include receiving control signaling indicating a value of the partial frequency parameter of the set of multiple values. The operations of 1710 may be performed in accordance with examples as disclosed herein. In some examples, aspects of the operations of 1710 may be performed by a control signaling manager 1130 as described with reference to FIG. 11.

At 1715, the method may include transmitting a sounding reference signal on a subset of time and frequency resources of the set of multiple subsets of time and frequency resources that corresponds to the value of the partial frequency parameter indicated by the received control signaling. The operations of 1715 may be performed in accordance with examples as disclosed herein. In some examples, aspects of the operations of 1715 may be performed by an SRS transmission manager 1135 as described with reference to FIG. 11.

Figure 18:
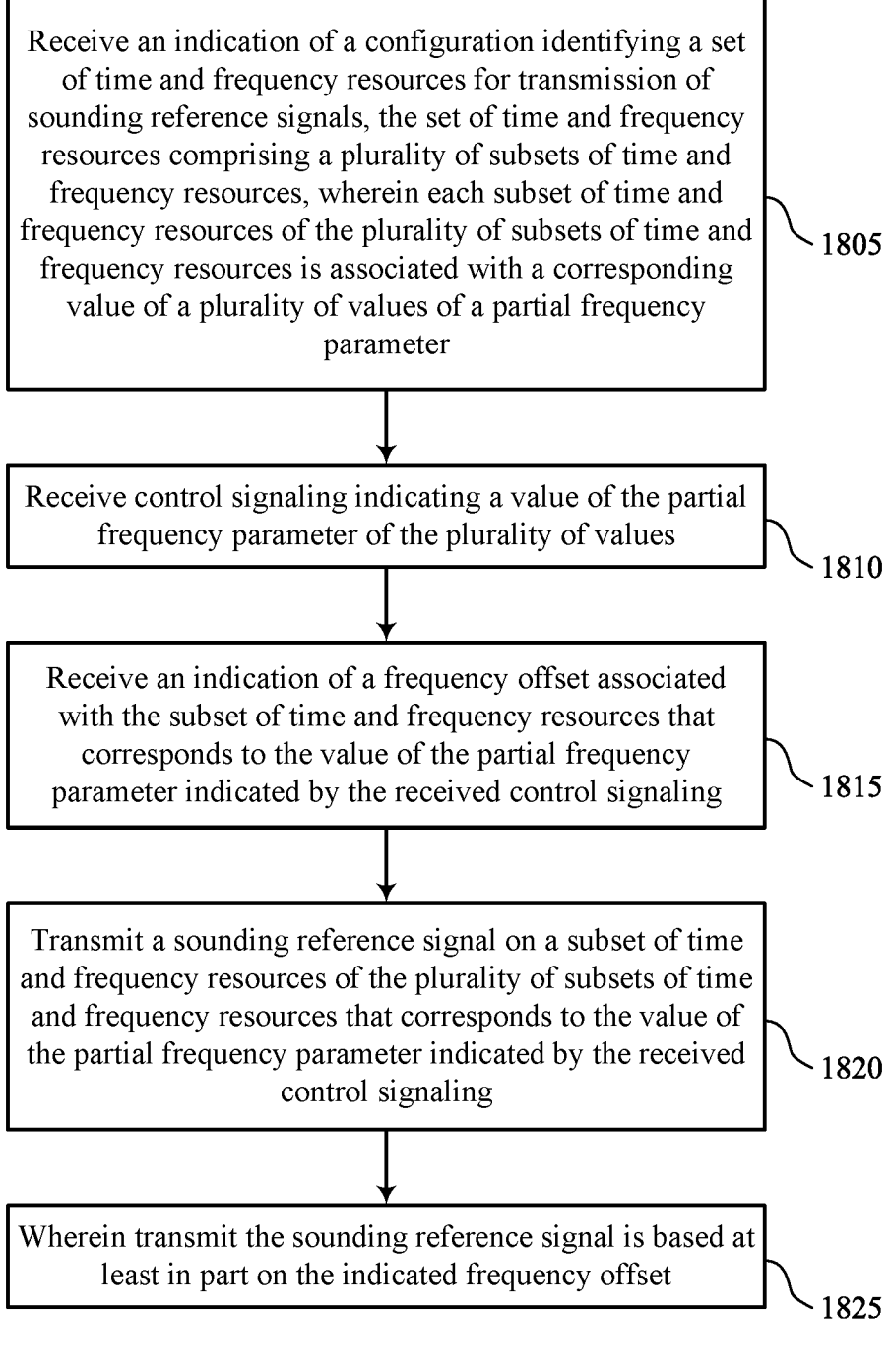

FIG. 18 shows a flowchart illustrating a method 1800 that supports configuration and indication of resources for partial frequency sounding in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The operations of 1805 may be performed in accordance with examples as disclosed herein. In some examples, aspects of the operations of 1805 may be performed by a configuration indication manager 1125 as described with reference to FIG. 11.

At 1810, the method may include receiving control signaling indicating a value of the partial frequency parameter of the set of multiple values. The operations of 1810 may be performed in accordance with examples as disclosed herein. In some examples, aspects of the operations of 1810 may be performed by a control signaling manager 1130 as described with reference to FIG. 11.

At 1815, the method may include receiving an indication of a frequency offset associated with the subset of time and frequency resources that corresponds to the value of the partial frequency parameter indicated by the received control signaling. The operations of 1815 may be performed in accordance with examples as disclosed herein. In some examples, aspects of the operations of 1815 may be performed by a frequency offset manager 1140 as described with reference to FIG. 11.

At 1820, the method may include transmitting a sounding reference signal on a subset of time and frequency resources of the set of multiple subsets of time and frequency resources that corresponds to the value of the partial frequency parameter indicated by the received control signaling. The operations of 1820 may be performed in accordance with examples as disclosed herein. In some examples, aspects of the operations of 1820 may be performed by an SRS transmission manager 1135 as described with reference to FIG. 11.

At 1825, the method may include where transmitting the sounding reference signal is based on the indicated frequency offset. The operations of 1825 may be performed in accordance with examples as disclosed herein. In some examples, aspects of the operations of 1825 may be performed by an SRS transmission manager 1135 as described with reference to FIG. 11.

FIG. 19 shows a flowchart illustrating a method 1900 that supports configuration and indication of resources for partial frequency sounding in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The operations of 1905 may be performed in accordance with examples as disclosed herein. In some examples, aspects of the operations of 1905 may be performed by a configuration indication manager 1125 as described with reference to FIG. 11.

At 1910, the method may include receiving control signaling indicating a value of the partial frequency parameter of the set of multiple values. The operations of 1910 may be performed in accordance with examples as disclosed herein. In some examples, aspects of the operations of 1910 may be performed by a control signaling manager 1130 as described with reference to FIG. 11.

At 1915, the method may include receiving an indication of a frequency offset associated with the subset of time and frequency resources that corresponds to the value of the partial frequency parameter indicated by the received control signaling. The operations of 1915 may be performed in accordance with examples as disclosed herein. In some examples, aspects of the operations of 1915 may be performed by a frequency offset manager 1140 as described with reference to FIG. 11.

At 1920, the method may include receiving control signaling indicating a frequency offset pattern for each value of the partial frequency parameter. The operations of 1920 may be performed in accordance with examples as disclosed herein. In some examples, aspects of the operations of 1920 may be performed by a frequency offset manager 1140 as described with reference to FIG. 11.

At 1925, the method may include where receiving the indication of the frequency offset further includes receiving an indication of a frequency offset pattern, the frequency offset pattern based on the indicated value of the partial frequency parameter, a number of symbols of the sounding resource signal, and the control signaling indicating a frequency offset pattern for each value of the partial frequency parameter. The operations of 1925 may be performed in accordance with examples as disclosed herein. In some examples, aspects of the operations of 1925 may be performed by a frequency offset manager 1140 as described with reference to FIG. 11.

At 1930, the method may include transmitting a sounding reference signal on a subset of time and frequency resources of the set of multiple subsets of time and frequency resources that corresponds to the value of the partial frequency parameter indicated by the received control signaling. The operations of 1930 may be performed in accordance with examples as disclosed herein. In some examples, aspects of the operations of 1930 may be performed by an SRS transmission manager 1135 as described with reference to FIG. 11.

At 1935, the method may include where transmitting the sounding reference signal is based on the indicated frequency offset. The operations of 1935 may be performed in accordance with examples as disclosed herein. In some examples, aspects of the operations of 1935 may be performed by an SRS transmission manager 1135 as described with reference to FIG. 11.

FIG. 20 shows a flowchart illustrating a method 2000 that supports configuration and indication of resources for partial frequency sounding in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include receiving an indication of a configuration identifying a set of time and frequency resources for transmission of sounding reference signals, the set of time and frequency resources including a set of multiple subsets of time and frequency resources, where each subset of time and frequency resources of the set of multiple subsets of time and frequency resources is associated with a corresponding value of a set of multiple values of a partial frequency parameter. The operations of 2005 may be performed in accordance with examples as disclosed herein. In some examples, aspects of the operations of 2005 may be performed by a configuration indication manager 1125 as described with reference to FIG. 11.

At 2010, the method may include receiving control signaling indicating a value of the partial frequency parameter of the set of multiple values. The operations of 2010 may be performed in accordance with examples as disclosed herein. In some examples, aspects of the operations of 2010 may be performed by a control signaling manager 1130 as described with reference to FIG. 11.

At 2015, the method may include receiving an indication of a frequency offset pattern, the frequency offset pattern being based on the indicated value of the partial frequency parameter, a number of physical resource blocks, a sounding reference signal counter, a symbol index, a slot index, a number of sounding reference signal symbols, or a combination thereof. The operations of 2015 may be performed in accordance with examples as disclosed herein. In some examples, aspects of the operations of 2015 may be performed by a frequency offset manager 1140 as described with reference to FIG. 11.

At 2020, the method may include receiving an indication of a frequency offset associated with the subset of time and frequency resources that corresponds to the value of the partial frequency parameter indicated by the received control signaling. The operations of 2020 may be performed in accordance with examples as disclosed herein. In some examples, aspects of the operations of 2020 may be performed by a frequency offset manager 1140 as described with reference to FIG. 11.

At 2025, the method may include transmitting a sounding reference signal on a subset of time and frequency resources of the set of multiple subsets of time and frequency resources that corresponds to the value of the partial frequency parameter indicated by the received control signaling. The operations of 2025 may be performed in accordance with examples as disclosed herein. In some examples, aspects of the operations of 2025 may be performed by an SRS transmission manager 1135 as described with reference to FIG. 11.

At 2030, the method may include where transmitting the sounding reference signal is based on the indicated frequency offset. The operations of 2030 may be performed in accordance with examples as disclosed herein. In some examples, aspects of the operations of 2030 may be performed by an SRS transmission manager 1135 as described with reference to FIG. 11.

The following provides an overview of aspects of the present disclosure:

Aspect 1: A method for wireless communications at a UE, comprising: receiving an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter; receiving control signaling indicating a value of the partial frequency parameter of the plurality of values; and transmitting a sounding reference signal on a subset of time and frequency resources of the plurality of subsets of time and frequency resources that corresponds to the value of the partial frequency parameter indicated by the received control signaling.

Aspect 2: The method of aspect 1, wherein receiving control signaling indicating the value of the partial frequency parameter comprises receiving a value of the partial frequency parameter of the plurality of values of the partial frequency parameter for each time resource of the subset of time and frequency resources on which the sounding reference signal is transmitted; and transmitting the sounding reference signal is based at least in part on the received value of the partial frequency parameter for each time resource.

Aspect 3: The method of any of aspects 1 through 2, wherein transmitting the sounding reference signal comprises: receiving an indication of a length of the sounding reference signal, the length of the sounding reference signal based at least in part on the value of the partial frequency parameter indicated by the received control signaling.

Aspect 4: The method of any of aspects 1 through 3, further comprising: receiving an indication of a frequency offset associated with the subset of time and frequency resources that corresponds to the value of the partial frequency parameter indicated by the received control signaling; wherein transmitting the sounding reference signal is based at least in part on the indicated frequency offset.

Aspect 5: The method of aspect 4, wherein receiving an indication of the frequency offset further comprises: receiving an indication of a frequency offset for each symbol of the transmitted sounding reference signal.

Aspect 6: The method of any of aspects 4 through 5, wherein receiving an indication of the frequency offset further comprises: receiving an indication of a frequency offset for each time resource slot at least partially occupied by the transmitted sounding reference signal.

Aspect 7: The method of any of aspects 4 through 6, further comprising: receiving control signaling indicating a frequency offset pattern for each value of the partial frequency parameter; wherein receiving the indication of the frequency offset further comprises receiving an indication of a frequency offset pattern, the frequency offset pattern based at least in part on the indicated value of the partial frequency parameter, a number of symbols of the sounding resource signal, and the control signaling indicating a frequency offset pattern for each value of the partial frequency parameter.

Aspect 8: The method of any of aspects 4 through 7, further comprising: receiving control signaling indicating a plurality of frequency offset patterns for each value of the partial frequency parameter; wherein receiving the indication of the frequency offset further comprises receiving an indication of a frequency offset pattern, the frequency offset pattern based at least in part on the indicated value of the partial frequency parameter and receiving control signaling indicating a frequency offset pattern of the plurality of frequency offset patterns corresponding to the indicated value of the partial frequency parameter.

Aspect 9: The method of any of aspects 4 through 8, wherein receiving the indication of the frequency offset further comprises: receiving an indication of a single frequency offset for the subset of time and frequency resources on which the sounding reference signal is transmitted.

Aspect 10: The method of aspect 9, wherein receiving the indication of the single frequency offset further comprises: receiving an indication of a frequency resource configuration value indicating a frequency domain shift in the subset of time and frequency resources on which the sounding reference signal is transmitted.

Aspect 11: The method of any of aspects 4 through 10, wherein receiving the indication of the frequency offset further comprises: receiving an indication of a frequency offset for each time resource of the subset of time and frequency resources on which the sounding reference signal is transmitted.

Aspect 12: The method of aspect 11, wherein receiving the indication of the frequency offset for each time resource further comprises: receiving an indication of a frequency resource configuration value for each time resource indicating a frequency domain shift in the subset of time and frequency resources on which the sounding reference signal is transmitted.

Aspect 13: The method of any of aspects 4 through 12, further comprising: receiving an indication of a frequency offset pattern, the frequency offset pattern being based at least in part on the indicated value of the partial frequency parameter, a number of physical resource blocks, a sounding reference signal counter, a symbol index, a slot index, a number of sounding reference signal symbols, or a combination thereof.

Aspect 14: The method of any of aspects 1 through 13, further comprising: receiving control signaling indicating a frequency resource configuration value indicating a frequency domain shift in the subset of time and frequency resources on which the sounding reference signal is transmitted or a frequency domain position reference point in the subset of time and frequency resources on which the sounding reference signal is transmitted.

Aspect 15: A method for wireless communications at a base station, comprising: transmitting, to a UE, an indication of a configuration identifying a set of time and frequency resources for the UE to use to transmit sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter; transmitting control signaling indicating a value of the partial frequency parameter of the plurality of values; and receiving a sounding reference signal on a subset of time and frequency resources of the plurality of subsets of time and frequency resources that corresponds to the value of the partial frequency parameter indicated by the received control signaling.

Aspect 16: The method of aspect 15, wherein transmitting control signaling indicating the value of the partial frequency parameter comprises transmitting a value of the partial frequency parameter of the plurality of values of the partial frequency parameter for each time resource of the subset of time and frequency resources on which the sounding reference signal is transmitted; and receiving the sounding reference signal is based at least in part on the transmitted value of the partial frequency parameter for each time resource.

Aspect 17: The method of any of aspects 15 through 16, wherein receiving the sounding reference signal comprises: transmitting an indication of a length of the sounding reference signal, the length of the sounding reference signal based at least in part on the value of the partial frequency parameter indicated by the received control signaling.

Aspect 18: The method of any of aspects 15 through 17, further comprising: transmitting an indication of a frequency offset associated with the subset of time and frequency resources that corresponds to the value of the partial frequency parameter indicated by the transmitted control signaling; wherein receiving the sounding reference signal is based at least in part on the indicated frequency offset.

Aspect 19: The method of aspect 18, wherein transmitting an indication of the frequency offset further comprises: transmitting an indication of a frequency offset for each symbol of the received sounding reference signal.

Aspect 20: The method of any of aspects 18 through 19, wherein transmitting an indication of the frequency offset further comprises: transmitting an indication of a frequency offset for each time resource slot at least partially occupied by the received sounding reference signal.

Aspect 21: The method of any of aspects 18 through 20, further comprising: transmitting control signaling indicating a frequency offset pattern for each value of the partial frequency parameter; wherein transmitting the indication of the frequency offset further comprises transmitting an indication of a frequency offset pattern, the frequency offset pattern based at least in part on the indicated value of the partial frequency parameter, a number of symbols of the sounding resource signal, and the control signaling indicating a frequency offset pattern for each value of the partial frequency parameter.

Aspect 22: The method of any of aspects 18 through 21, further comprising: transmitting control signaling indicating a plurality of frequency offset patterns for each value of the partial frequency parameter; wherein transmitting the indication of the frequency offset further comprises transmitting an indication of a frequency offset pattern, the frequency offset pattern based at least in part on the indicated value of the partial frequency parameter and transmitting control signaling indicating a frequency offset pattern of the plurality of frequency offset patterns corresponding to the indicated value of the partial frequency parameter.

Aspect 23: The method of any of aspects 18 through 22, wherein transmitting the indication of the frequency offset further comprises: transmitting an indication of a single frequency offset for the subset of time and frequency resources on which the sounding reference signal is received.

Aspect 24: The method of aspect 23, wherein transmitting the indication of the single frequency offset further comprises: transmitting an indication of a frequency resource configuration value indicating a frequency domain shift in the subset of time and frequency resources on which the sounding reference signal is transmitted.

Aspect 25: The method of any of aspects 18 through 24, wherein transmitting the indication of the frequency offset further comprises: transmitting an indication of a frequency offset for each time resource of the subset of time and frequency resources on which the sounding reference signal is transmitted.

Aspect 26: The method of aspect 25, wherein transmitting the indication of the frequency offset for each time resource further comprises: transmitting an indication of a frequency resource configuration value for each time resource indicating a frequency domain shift in the subset of time and frequency resources on which the sounding reference signal is transmitted.

Aspect 27: The method of any of aspects 18 through 26, further comprising: transmitting an indication of a frequency offset pattern, the frequency offset pattern being based at least in part on the indicated value of the partial frequency parameter, a number of physical resource blocks, a sounding reference signal counter, a symbol index, a slot index, a number of sounding reference signal symbols, or a combination thereof.

Aspect 28: The method of any of aspects 15 through 27, further comprising: transmitting control signaling indicating, in the subset of time and frequency resources on which the sounding reference signal is received, a frequency resource configuration value indicating a frequency domain or a frequency domain position reference point.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter, wherein each value of the partial frequency parameter indicates a proportion of the set of time and frequency resources to be used for partial frequency sounding;

receiving control signaling indicating a value of the partial frequency parameter of the plurality of values; and transmitting a sounding reference signal on a subset of time and frequency resources of the plurality of subsets of time and frequency resources that corresponds to the value of the partial frequency parameter indicated by the received control signaling, wherein a length of the sounding reference signal is scaled based on the value of the partial frequency parameter indicated by the control signaling.

2. The method of claim 1, wherein:

receiving control signaling indicating the value of the partial frequency parameter comprises receiving a value of the partial frequency parameter of the plurality of values of the partial frequency parameter for each time resource of the subset of time and frequency resources on which the sounding reference signal is transmitted; and transmitting the sounding reference signal is based at least in part on the received value of the partial frequency parameter for each time resource.

3. The method of claim 1, further comprising:

receiving an indication of the length of the sounding reference signal.

4. The method of claim 1, further comprising:

receiving an indication of a frequency offset associated with the subset of time and frequency resources that corresponds to the value of the partial frequency parameter indicated by the received control signaling;

wherein transmitting the sounding reference signal is based at least in part on the indicated frequency offset.

5. The method of claim 4, wherein receiving an indication of the frequency offset further comprises:

receiving an indication of a frequency offset for each symbol of the transmitted sounding reference signal.

6. The method of claim 4, wherein receiving an indication of the frequency offset further comprises:

receiving an indication of a frequency offset for each time resource slot at least partially occupied by the transmitted sounding reference signal.

7. The method of claim 4, further comprising:

receiving control signaling indicating a frequency offset pattern for each value of the partial frequency parameter;

wherein receiving the indication of the frequency offset further comprises receiving an indication of a frequency offset pattern, the frequency offset pattern based at least in part on the indicated value of the partial frequency parameter, a number of symbols of the sounding resource signal, and the control signaling indicating a frequency offset pattern for each value of the partial frequency parameter.

8. The method of claim 4, further comprising:

receiving control signaling indicating a plurality of frequency offset patterns for each value of the partial frequency parameter;

wherein receiving the indication of the frequency offset further comprises receiving an indication of a frequency offset pattern, the frequency offset pattern based at least in part on the indicated value of the partial frequency parameter and receiving control signaling indicating a frequency offset pattern of the plurality of frequency offset patterns corresponding to the indicated value of the partial frequency parameter.

9. The method of claim 4, wherein receiving the indication of the frequency offset further comprises:

receiving an indication of a single frequency offset for the subset of time and frequency resources on which the sounding reference signal is transmitted.

10. The method of claim 9, wherein receiving the indication of the single frequency offset further comprises:

receiving an indication of a frequency resource configuration value indicating a frequency domain shift in the subset of time and frequency resources on which the sounding reference signal is transmitted.

11. The method of claim 4, wherein receiving the indication of the frequency offset further comprises:

receiving an indication of a frequency offset for each time resource of the subset of time and frequency resources on which the sounding reference signal is transmitted.

12. The method of claim 11, wherein receiving the indication of the frequency offset for each time resource further comprises:

receiving an indication of a frequency resource configuration value for each time resource indicating a frequency domain shift in the subset of time and frequency resources on which the sounding reference signal is transmitted.

13. The method of claim 4, further comprising:

receiving an indication of a frequency offset pattern, the frequency offset pattern being based at least in part on the indicated value of the partial frequency parameter, a number of physical resource blocks, a sounding reference signal counter, a symbol index, a slot index, a number of sounding reference signal symbols, or a combination thereof.

14. The method of claim 1, further comprising:

receiving control signaling indicating a frequency resource configuration value indicating a frequency domain shift in the subset of time and frequency resources on which the sounding reference signal is transmitted or a frequency domain position reference point in the subset of time and frequency resources on which the sounding reference signal is transmitted.

15. A method for wireless communications at a base station, comprising:

transmitting, to a user equipment (UE), an indication of a configuration identifying a set of time and frequency resources for the UE to use to transmit sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter, wherein each value of the partial frequency parameter indicates a proportion of the set of time and frequency resources to be used for partial frequency sounding;

transmitting control signaling indicating a value of the partial frequency parameter of the plurality of values; and receiving a sounding reference signal on a subset of time and frequency resources of the plurality of subsets of time and frequency resources that corresponds to the value of the partial frequency parameter indicated by the received control signaling, wherein a length of the sounding reference signal is scaled based on the value of the partial frequency parameter indicated by the control signaling.

16. The method of claim 15, wherein:

transmitting control signaling indicating the value of the partial frequency parameter comprises transmitting a value of the partial frequency parameter of the plurality of values of the partial frequency parameter for each time resource of the subset of time and frequency resources on which the sounding reference signal is transmitted; and receiving the sounding reference signal is based at least in part on the transmitted value of the partial frequency parameter for each time resource.

17. The method of claim 15, further comprising:

transmitting an indication of the length of the sounding reference signal.

18. The method of claim 15, further comprising:

transmitting an indication of a frequency offset associated with the subset of time and frequency resources that corresponds to the value of the partial frequency parameter indicated by the transmitted control signaling;

wherein receiving the sounding reference signal is based at least in part on the indicated frequency offset.

19. The method of claim 18, wherein transmitting an indication of the frequency offset further comprises:

transmitting an indication of a frequency offset for each symbol of the received sounding reference signal.

20. The method of claim 18, wherein transmitting an indication of the frequency offset further comprises:

transmitting an indication of a frequency offset for each time resource slot at least partially occupied by the received sounding reference signal.

21. The method of claim 18, further comprising:

transmitting control signaling indicating a frequency offset pattern for each value of the partial frequency parameter;

wherein transmitting the indication of the frequency offset further comprises transmitting an indication of a frequency offset pattern, the frequency offset pattern based at least in part on the indicated value of the partial frequency parameter, a number of symbols of the sounding resource signal, and the control signaling indicating a frequency offset pattern for each value of the partial frequency parameter.

22. The method of claim 18, further comprising:

transmitting control signaling indicating a plurality of frequency offset patterns for each value of the partial frequency parameter;

wherein transmitting the indication of the frequency offset further comprises transmitting an indication of a frequency offset pattern, the frequency offset pattern based at least in part on the indicated value of the partial frequency parameter and transmitting control signaling indicating a frequency offset pattern of the plurality of frequency offset patterns corresponding to the indicated value of the partial frequency parameter.

23. The method of claim 18, wherein transmitting the indication of the frequency offset further comprises:

transmitting an indication of a single frequency offset for the subset of time and frequency resources on which the sounding reference signal is received.

24. The method of claim 18, wherein transmitting the indication of the frequency offset further comprises:

transmitting an indication of a frequency offset for each time resource of the subset of time and frequency resources on which the sounding reference signal is transmitted.

25. The method of claim 18, further comprising:

transmitting an indication of a frequency offset pattern, the frequency offset pattern being based at least in part on the indicated value of the partial frequency parameter, a number of physical resource blocks, a sounding reference signal counter, a symbol index, a slot index, a number of sounding reference signal symbols, or a combination thereof.

26. The method of claim 15, further comprising:

transmitting control signaling indicating, in the subset of time and frequency resources on which the sounding reference signal is received, a frequency resource configuration value indicating a frequency domain or a frequency domain position reference point.

27. An apparatus for wireless communications at a user equipment (UE), comprising:

a processor;

memory coupled with the processor; and instructions stored in the memory and executable by the processor to cause the apparatus to:

receive an indication of a configuration identifying a set of time and frequency resources for transmission of sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter, wherein each value of the partial frequency parameter indicates a proportion of the set of time and frequency resources to be used for partial frequency sounding;

receive control signaling indicating a value of the partial frequency parameter of the plurality of values; and transmit a sounding reference signal on a subset of time and frequency resources of the plurality of subsets of time and frequency resources that corresponds to the value of the partial frequency parameter indicated by the received control signaling, wherein a length of the sounding reference signal is scaled based on the value of the partial frequency parameter indicated by the control signaling.

28. The apparatus of claim 27, wherein the instructions are further executable by the processor to cause the apparatus to:

receive control signaling indicating the value of the partial frequency parameter comprises receiving a value of the partial frequency parameter of the plurality of values of the partial frequency parameter for each time resource of the subset of time and frequency resources on which the sounding reference signal is transmitted; and transmit the sounding reference signal is based at least in part on the received value of the partial frequency parameter for each time resource.

29. The apparatus of claim 27, wherein the instructions are further executable by the processor to cause the apparatus to:

receive an indication of the length of the sounding reference signal.

30. An apparatus for wireless communications at a base station, comprising:

a processor;

memory coupled with the processor; and instructions stored in the memory and executable by the processor to cause the apparatus to:

transmit, to a user equipment (UE), an indication of a configuration identifying a set of time and frequency resources for the UE to use to transmit sounding reference signals, the set of time and frequency resources comprising a plurality of subsets of time and frequency resources, wherein each subset of time and frequency resources of the plurality of subsets of time and frequency resources is associated with a corresponding value of a plurality of values of a partial frequency parameter, wherein each value of the partial frequency parameter indicates a proportion of the set of time and frequency resources to be used for partial frequency sounding;

transmit control signaling indicating a value of the partial frequency parameter of the plurality of values; and receive a sounding reference signal on a subset of time and frequency resources of the plurality of subsets of time and frequency resources that corresponds to the value of the partial frequency parameter indicated by the received control signaling, wherein a length of the sounding reference signal is scaled based on the value of the partial frequency parameter indicated by the control signaling.

\* \* \* \* \*